(12) United States Patent
Nakazaki et al.

(10) Patent No.: US 6,222,839 B1
(45) Date of Patent: Apr. 24, 2001

(54) PACKET SWITCHING APPARATUS

(75) Inventors: Soko Nakazaki; Kiyoto Fujita, both of Tokyo (JP)

(73) Assignee: Oki Electric Industry, Co., LTD (JP)

( * ) Notice: Subject to any disclaimer, the term of this patent is extended or adjusted under 35 U.S.C. 154(b) by 0 days.

(21) Appl. No.: 09/025,029

(22) Filed: Feb. 18, 1998

(30) Foreign Application Priority Data

Feb. 19, 1997 (JP) .................................................... 9-034696

(51) Int. Cl.[7] .................................................... H04L 12/56
(52) U.S. Cl. .......................... 370/352; 370/395; 370/400
(58) Field of Search .................................. 370/230–235, 370/350, 351, 352, 353, 354, 389, 396, 395, 400, 401–404, 465, 466, 467, 463, 464

(56) References Cited

U.S. PATENT DOCUMENTS

| 5,473,608 | * | 12/1995 | Gagne et al. | 370/403 |
| 5,696,764 | * | 12/1997 | Soumiya et al. | 370/395 |
| 5,835,710 | * | 11/1998 | Nagami et al. | 370/351 |
| 5,915,008 | * | 6/1999 | Dulman | 370/466 |
| 5,920,705 | * | 7/1999 | Lyon et al. | 370/400 |

FOREIGN PATENT DOCUMENTS

| 9-046352 | 2/1997 | (JP) . |
| 9-116560 | 5/1997 | (JP) . |

* cited by examiner

*Primary Examiner*—Alpus H. Hsu
*Assistant Examiner*—Afsar M. Qureshi
(74) *Attorney, Agent, or Firm*—Venable; Robert J. Frank; James R. Burdett

(57) ABSTRACT

The invention effectively avoids a CPU congestion in a packet switching apparatus. For this purpose, a packet switching apparatus of the invention comprises an AAL part connected with an ATM communication network where communication is performed in packets, a LAN control part connected to a LAN where communication is performed in frames, an IP part for translating a communication protocol of the ATM communication network and a communication protocol of the LAN communication network into each other, a congestion monitoring part for judging whether or not this IP part is in a congestion state, and an IP routing part for discarding a part or all of IP frames received by the LAN control part in case that this congestion monitoring part has judged that the IP part is in a congestion state.

12 Claims, 18 Drawing Sheets

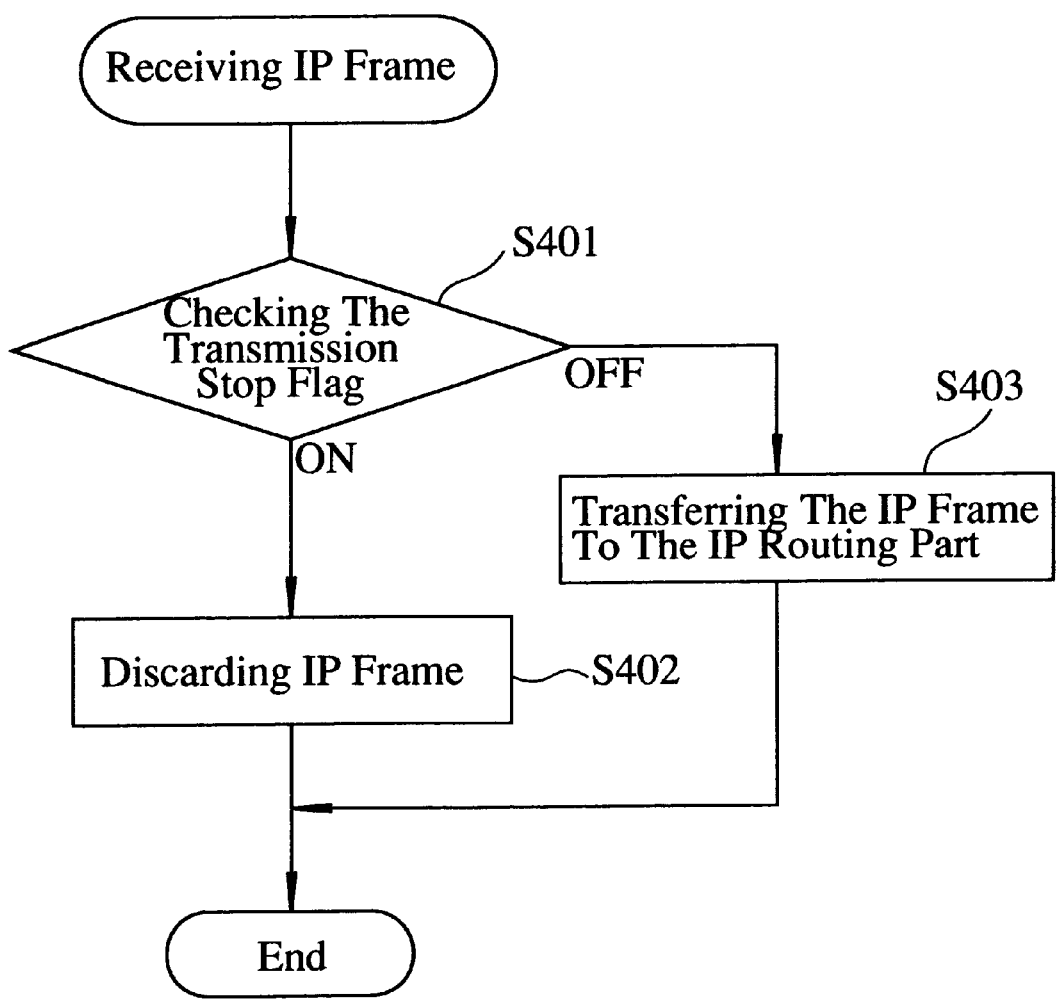

FIG.8

| IP Address | ATM Address | Priority Order | Control Status |
|---|---|---|---|
| ATM Switching Apparatus 501 | ATM Switching Apparatus 501 | A | 1 |
| ATM Switching Apparatus 502 | ATM Switching Apparatus 502 | B | 1 |
| ATM Switching Apparatus 503 | ATM Switching Apparatus 503 | B | 1 |
| ATM Switching Apparatus 504 | ATM Switching Apparatus 504 | C | 1 |

| Version | IHL | Service Time | Total Length | |
|---|---|---|---|---|
| ID | | | Flag | Fragment Offset |
| Time To Leave | | Protocol | Header Checksum | |
| Originator Address | | | | |
| Destination Address | | | | |
| Congestion Indicator | | | | |

1400

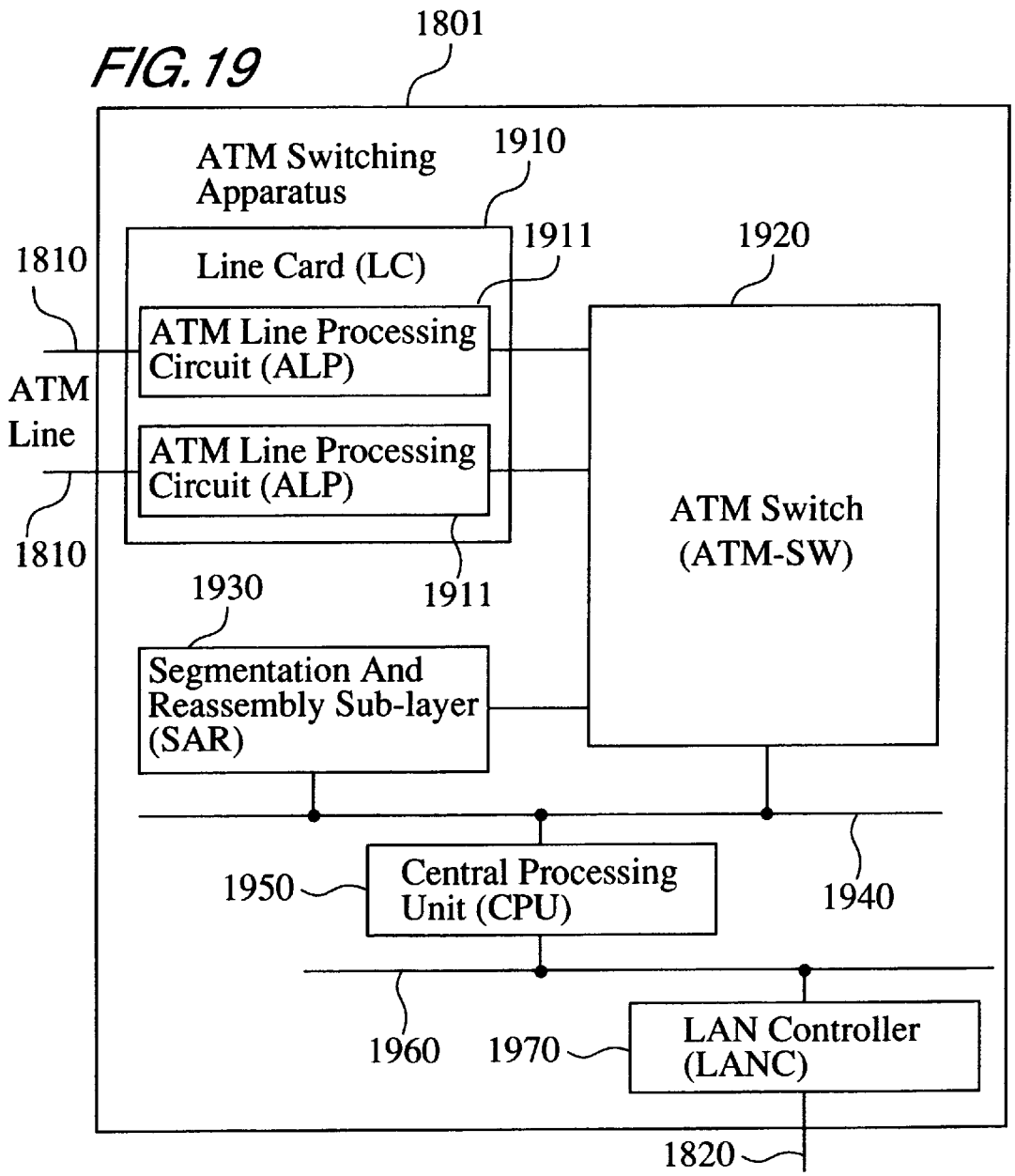

PACKET SWITCHING APPARATUS

BACKGROUND OF THE INVENTION

1. Field of the Invention

The present invention relates to a packet switching apparatus for connecting a packet switching network such as an asynchronous transfer mode (ATM) network and the like with another communication network.

2. Description of the Related Art

A former packet switching apparatus is described taking a case of connecting a local area network (LAN) and an ATM network with each other as an example.

FIG. 18(A) is a block diagram roughly showing a connection relation of ATM switching apparatuses and a LAN terminal, and FIG. 18(B) is a conceptual diagram roughly showing a logical structure of each of the ATM switching apparatuses and the LAN terminal.

In FIG. 18(A), the ATM switching apparatuses 1801, 1802 and 1803, which are connected with one another through ATM lines 1810 and 1810, form an ATM network. Although the three ATM switching apparatuses 1801, 1802 and 1803 are connected in series with one another in order to simplify description in FIG. 18(A), actually the number of ATM switching apparatuses may be more and the ATM switching apparatuses may be connected with one another in the shape of a ring, a mesh or the like by means of the ATM lines 1810.

In FIG. 18(A), the ATM switching apparatus 1801 is connected to a LAN terminal 1804 through a LAN line 1820. And a protocol translation for realizing communication between the LAN and the ATM network is performed in the ATM switching apparatus 1801.

As shown in FIG. 18(B), the LAN terminal 1804 is provided with a transmission control protocol (TCP) layer, an Internet protocol (IP) layer, and a media access control (MAC) layer. Each of the ATM switching apparatuses 1802 and 1803 is provided with a TCP layer, an IP layer, an AAL layer, and an ATM layer. On the other hand, in order to perform a protocol translation between the LAN and the ATM network, the ATM switching apparatus 1801 is provided with an MAC layer in addition to a TCP layer, an IP layer, an ATM adaptation layer (AAL), and an ATM layer. In FIG. 18(B), MAC shows a functional block of a physical layer of a LAN interface and ATM shows a functional block for processing the ATM layer of an ATM interface.

As shown in FIG. 18(B), the ATM switching apparatus 1801 relays transfer of an IP frame to the other ATM switching apparatuses 1802 and 1803 and delivers an IP frame to an application of the ATM switching apparatus 1801 itself. Such relaying and delivering operations are performed by an IP routing part 2034 (see FIG. 20) as described later.

FIG. 19 is a block diagram roughly showing a hardware configuration of the ATM switching apparatus 1801 shown in FIGS. 18(A) and 18(B).

This ATM switching apparatus 1801 accommodates one or plural ATM terminals (not illustrated), and is connected with other ATM switching apparatuses (not shown in FIG. 19) through the ATM lines 1810, as described above. This ATM switching apparatus 1801 is provided with a control bus 1960 and a LAN controller 1970 in addition to a line card 1910, an ATM switch 1920, a segmentation and reassembly sub-layer (SAR) 1930, a processor bus 1940, and a central processing unit (CPU) 1950.

Here, the line card 1910 is provided with plural ATM line packages 1911 (only two ATM line packages are shown in FIG. 19 for simplifying the description). These ATM line packages 1911 are connected to another ATM switching apparatus or another ATM terminal through an ATM line 1810, and send and receive ATM cells to and from another ATM switching apparatus or another ATM terminal.

The ATM switch 1920 transfers an ATM cell inputted from an ALP 1911 to another ALP 1911 or transfers an ATM cell between an ALP 1911 and a SAR 1930 on the basis of control of the CPU 1950.

The SAR 1930 is a circuit for terminating an ATM adaptation layer. That is to say, in case of sending information from an ATM network to a LAN,. it assembles an IP frame from ATM cells inputted from the ATM switch 1920 and sends this IP frame to the CPU 1950. In case of sending information from a LAN to an ATM network, it disassembles an IP frame inputted from the CPU 1950 into ATM cells and sends these ATM cells to the ATM switch 1920. This SAR 1930 is provided with a message buffer and a control information buffer.

The CPU 1950 performs the initial setting and status management of each part inside the ATM switching apparatus 1801 and performs a connection setting of the ATM switch 1920, an AAL control, and the like. Furthermore, the CPU 1950 sends and receives an IP frame to and from the LAN controller 1970 through the control bus 1960.

The LAN controller 1970 is connected to a LAN terminal 1804 (see FIGS. 18) through a port 1820 having an existing LAN interface, and performs information transmission to and reception from the LAN terminal 1804. Here, an Ethernet interface (Ethernet is a registered trademark), for example, can be used as a LAN interface.

FIG. 20 is a functional block diagram for explaining a communication function of the ATM switching apparatus 1801. Functional blocks 2010 to 2040 in FIG. 20 are realized mainly by the software executed by the CPU 1950. FIG. 20 shows a case where the TCP/IP protocol is adopted as a LAN protocol in the same way as FIG. 18.

As shown in FIG. 20, the ATM switching apparatus 1801 is provided with a LAN control part 2010, an AAL part 2020, an IP part 2030, and a TCP part 2040 as functional blocks for realizing communication between a LAN terminal and an ATM network. The IP part 2030 is provided with an IP routing part 2031.

The LAN control part 2010 is a functional block for performing transmission and reception of an IP frame to and from a LAN terminal 1804 (see FIG. 18) through the LAN controller 1970 (see FIG. 19). That is to say, the LAN control part 2010 transfers an IP frame to the IP routing part 2031 when receiving the IP frame outputted by the LAN terminal 1804 from the LAN controller 1970, and transfers an IP frame to the LAN controller 1970 when receiving the IP frame from the IP routing part 2031.

The AAL part 2020 is a functional block for controlling a process of ATM adaptation layer. That is to say, the AAL part 2020 controls SAR 1930 (see FIG. 19) to disassemble or assemble ATM cells as described above. That is to say, the AAL part 2020 transfers an IP frame to the IP routing part 2031 when receiving the IP frame assembled by SAR 1930, and controls the SAR 1930 and the ATM switch 1920 to disassemble and transmit an IP frame when receiving from the IP routing part 2031 an instruction of transmitting the IP frame to other ATM switching apparatuses 1802 and 1803 (see FIG. 18) or another ATM terminal (not illustrated).

The IP routing part 2031 is a functional block which recognizes the destination address of an IP frame received by the LAN terminal control part 2010 or the AAL control part 2020 and performs a routing control according to this recognition result. That is to say, in case that the destination address of an IP frame received by the LAN terminal control part 2010 coincides with the address of the ATM switching apparatus 1802 or 1803, the IP routing part 2031 starts the AAL control part 2020 and makes it transfer the IP frame to the ATM switching apparatus indicated by the destination address. In case that the destination address of an IP frame received by the AAL control part 2020 coincides with the address of the ATM terminal 1804, the IP routing part 2031 starts the LAN terminal control part 2010 and sends the IP frame to the LAN terminal 1804. In case that the destination address of an IP frame received by the LAN terminal control part 2010 or the AAL control part 2020 coincides with the address of the ATM switching apparatus 1801 itself, the IP routing part 2031 transfers the IP frame to the TCP part 2040 through the IP part 2030. In case that the destination address of an IP frame which the AAL control part 2020 has received from one of the ATM switching apparatuses 1802 and 1803 coincides with the address of the other of the ATM switching apparatuses 1802 and 1803, the IP routing part 2031 makes the AAL control part 2020 transfer the IP frame to the ATM switching apparatus indicated by the destination address.

The IP part 2030 performs a network layer processing, taking the TCP part 2040 as a client. Due to this, it is possible to perform a data transmission service on a complicated network.

The TCP part 2040 performs process of a transport layer (not illustrated) processing. Due to this, it is possible to provide a reliable communication means of a connection type to an upper layer.

FIG. 21 is a flowchart for explaining a routing control process performed by the IP routing part 2031.

The IP routing part 2031 registers IP addresses of the ATM switching apparatus 1801 and other ATM switching apparatuses 1802 and 1803 at an address resolution protocol (ARP) table (not illustrated) at the time of resetting the ATM switching apparatus 1801 or turning power on.

Following this, the IP routing part 2031 controls the respective parts 1910 to 1970 of the ATM switching apparatus so as to perform operations for taking in IP frames from the ATM line 1810 and the LAN line 1820. Furthermore, the IP routing part 2031 issues an instruction to the IP part 2030 to perform an operation for taking in an IP frame from the TCP part 2040.

When the LAN control part 2010, the AAL part 2020, or the TCP part 2040 has actually taken in an IP frame and the IP routing part 2031 has accepted the IP frame, the IP routing part 2031 starts a control process as shown in FIG. 21.

The IP routing part 2031 first judges whether or not the destination IP address of a received IP frame coincides with the IP address of the ATM switching apparatus 1801 itself (S2101). In case that both of these addresses coincide with each other, the IP routing part 2031 judges that the destination of the received IP frame is the ATM switching apparatus 1801 itself and transfers the received IP frame to the TCP part 2040 through the IP part 2030 (S2102).

On the other hand, in case that the destination IP address does not coincide with the IP address of the ATM switching apparatus 1801 itself in step S2101, the IP routing part 2031 then judges whether or not the destination IP address coincides with the IP address of the LAN line 1820 (namely, the LAN terminal 1804) (S2103). In case that both of these addresses coincide with each other, the IP routing part 2031 transfers the received IP frame to the LAN control part 2010 (S2104). Then this IP frame is sent to the LAN terminal 1804 by control of the LAN control part 2010.

On the other hand, in case that the destination IP address does not coincide with the IP address of the LAN line 1820 in step S2103, the IP routing part 2031 then performs a route selection for transferring the IP frame to another ATM switching apparatus 1802 or 1803 (S2105). And the IP routing part 2031 selects an ATM line number corresponding to the selected route, and selects a predetermined connection (S2106), and then delivers control to the AAL part 2020 (S2107). Due to this, this IP frame is sent to one of the other ATM switching apparatuses 1802 and 1803 by control of the AAL part 2020.

In such a way, as described above, an IP frame can be transferred by the IP routing part 2031 to another ATM switching apparatus 1802 or 1803 or the like (see FIG. 18(B)).

In a communication network as shown in FIG. 18(A), in case that a LAN terminal 1804 performs communication with the ATM switching apparatuses 1801 to 1803 at the same time, the IP routing part 2031 (see FIG. 20) of the ATM switching apparatus 1801 accommodating the LAN terminal 1804 has a very great frequency of execution (the number of executions per unit time) of a routing process (see FIG. 21) as described above.

Hereupon, as described above, the IP routing part 2031 is implemented mainly as software of the CPU 1950 (see FIG. 19). Therefore, if the frequency of execution of the routing process increases, an activity rate of the CPU 1950 becomes higher. When the activity rate of the CPU 1950 becomes a value close to 100% (90% or more for example), then there is the possibility that it is impossible to exactly perform the following IP frame transferring process or the like, caused by that an IP frame processing by the IP routing part 2031 is delayed.

Hereupon, the activity rate A of the CPU is given by the following expression:

$$A=100-[(Y/X)\times 100]$$

In this expression, each of X and Y is the number of operations per unit time when repeatedly operating a certain program at fixed periods, and X is the number of operations in case that the CPU 1950 has no load and Y is the number of actual operations. Accordingly as a load on the CPU 1950 increases, the value of Y decreases and so the value of an activity rate A of the CPU increases.

Hereinafter it is referred to as a "CPU congestion" that the activity rate A reaches a value close to 100% (90% or more for example).

Up to now, in order to avoid such a CPU congestion, in case that the activity rate A of the CPU 1950 is high, a part of ATM cells which the ATM switching apparatus 1801 has received from other ATM switching apparatuses 1802 and 1803 and the like (see FIG. 18) has been discarded through the line card 1910 or the ATM switch 1920 (see FIG. 15).

However, although this method is effective in case that the increase of the activity rate A of the CPU 1950 is caused by the increase of the number of received ATM cells, this method may not be so effective in case that the increase of the activity rate A is caused by the increase of the number of IP frames received from the LAN line 1820. Due to this, has been impossible to sufficiently reduce the activity rate A of the CPU 1950 and avoid a CPU congestion in case that the number of IP frames which the ATM switching apparatus receives from the LAN line 1820 increases.

SUMMARY OF THE INVENTION

An object of the present invention is to provide a packet switching apparatus capable of avoiding a CPU congestion.

For the purpose of this, a packet switching apparatus according to the present invention comprises a packet communication part connected to a first communication network for performing communication in packets, a frame communication part connected to a second communication network for performing communication in frames, a protocol translation part for cross-translating a communication protocol of the first communication network and a communication protocol of the second communication network into each other, a congestion monitoring part for judging whether or not the protocol translation part is in a congestion state, and a control part for discarding a part or all of frames received by the frame communication part in case that the congestion monitoring part has judged that the protocol translation part is in a congestion state.

BRIEF DESCRIPTION OF THE DRAWINGS

The followings and other objects, features and advantages of the present invention will be better understood from the following description in connection with the accompanying drawings, in which:

FIG. 4 is a flowchart for explaining an example of concrete operations of an IP part shown in FIG. 1;

FIG. 8 is a conceptual diagram showing composition of an IP address table provided in an IP routing part shown in FIG. 6;

FIG. 19 is a block diagram roughly showing a hardware configuration of the ATM switching apparatuses shown in FIG. 18;

DESCRIPTION OF THE PREFERRED EMBODIMENTS

Embodiments of the present invention are described with reference to the drawings in the following. It should be understood that the drawings show components in size, in shape, and in relation of arrangement only so roughly as to understand the present invention, and the numerical conditions described below are only examples.

First Embodiment

A packet switching apparatus according to a first embodiment of the present invention is described below, taking a case of applying it to an ATM switching apparatus as an example.

Figure 18A:
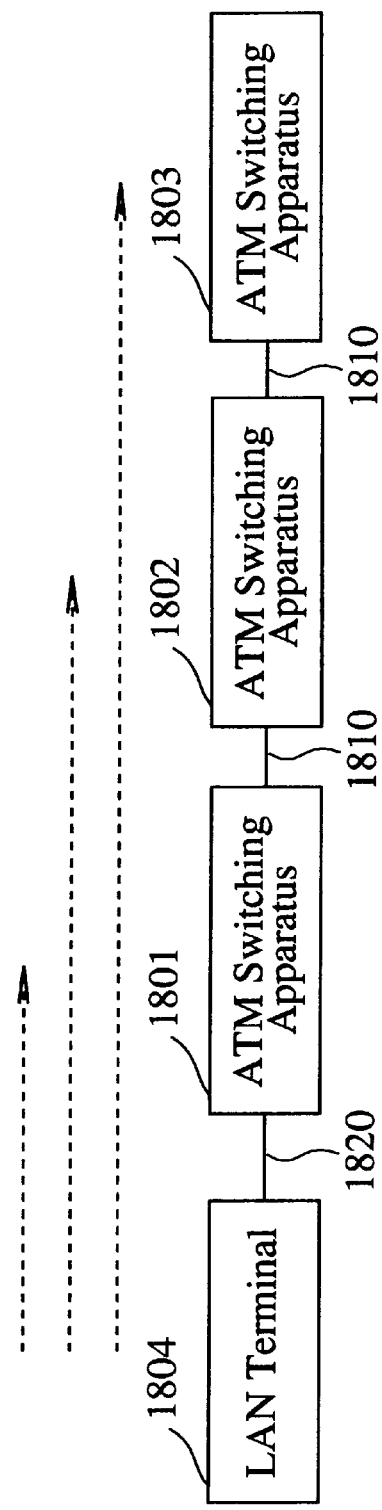
FIG. 18(A) is a block diagram roughly showing a connection relation of former ATM switching apparatuses and a LAN terminal.
Figure 18B:
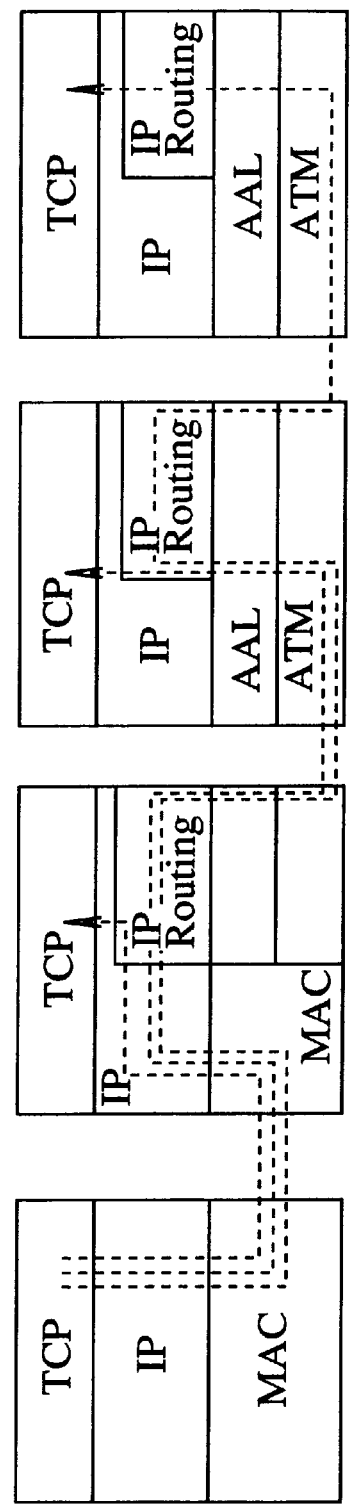
FIG. 18(B) is a conceptual diagram roughly showing logical structures of former ATM switching apparatuses and a LAN terminal.

This embodiment is described taking as an example a case of using an ATM switching apparatus in a communication network similar to a former communication network (see FIG. 18).

An ATM switching apparatus according to this embodiment is nearly the same as a former ATM switching apparatus (see FIG. 19) in hardware configuration, but is different from the former apparatus in an IP frame transferring function performed by a CPU 1950.

Figure 1:
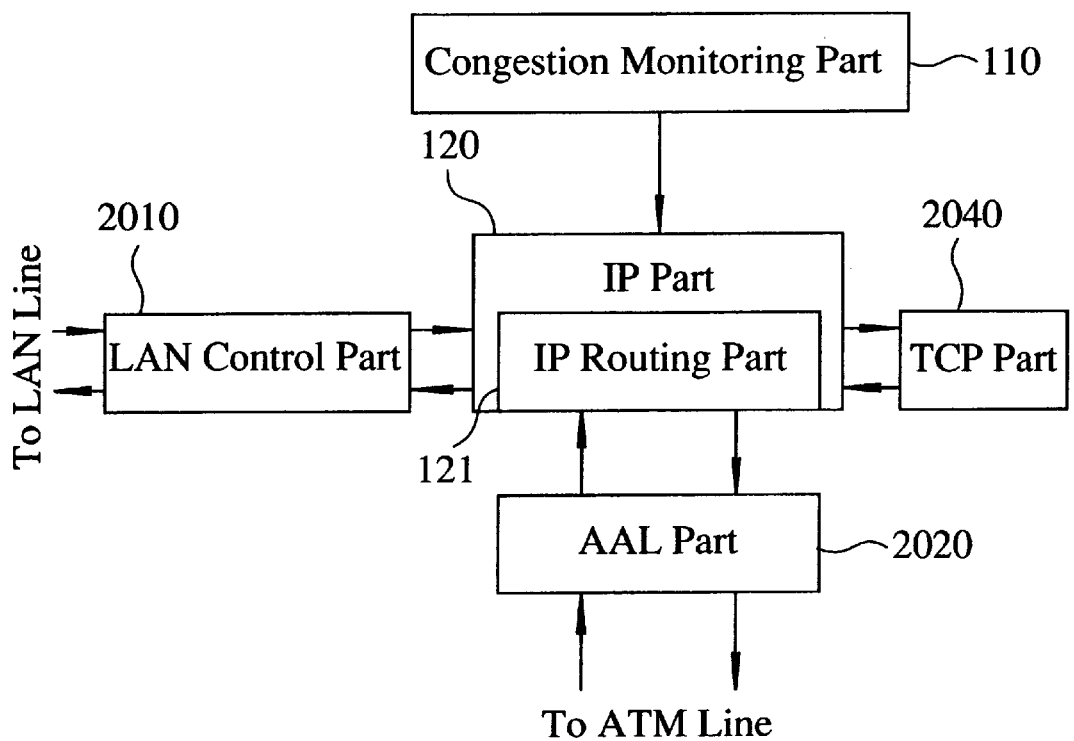
FIG. 1 is a functional block diagram for explaining a communication function of an ATM switching apparatus according to a first embodiment of the present invention.

FIG. 1 is a functional block diagram for explaining a communication function of an ATM switching apparatus according to this embodiment. In FIG. 1, since blocks to which the same symbols as former functional blocks (see FIG. 20) are given have respectively the same functions as blocks of a former ATM switching apparatus, description of them is omitted. In the same way as FIG. 20, FIG. 1 also shows a case where the TCP/IP protocol is used as a LAN protocol.

In FIG. 1, a congestion monitoring part 110 has a calculating section (not illustrated) for calculating a CPU activity rate A. The congestion monitoring part 110 always monitors the CPU activity rate A by means of the calculating section and compares the CPU activity rate A and a specified threshold value (hereinafter referred to as a "congestion judging threshold value") TH with each other. In case that the CPU activity rate A has become larger than the congestion judging threshold value TH, the congestion monitoring part 110 issues a CPU congestion notification to an IP routing part 121. On the other hand, in case that the CPU activity rate A has become smaller than the congestion judging threshold value TH, the congestion monitoring part 110 issues a CPU congestion-cleared notification to the IP routing part 121.

Figure 20:
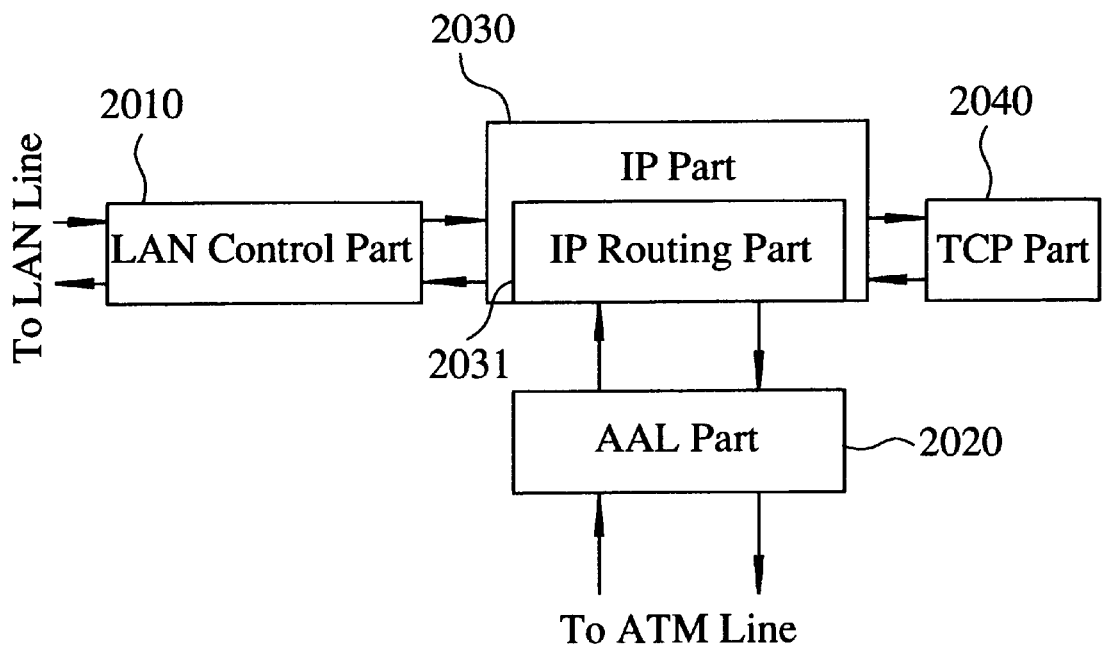
FIG. 20 is a functional block diagram for explaining a communication function of the ATM switching apparatuses shown in FIG. 18.

An IP part 120 has a function of discarding a part or all of IP frames when a CPU congestion has happened, in addition to functions of a former IP part 2030 (see FIG. 20).

The IP routing part 121 has a function of making the IP part 120 discard an IP frame by sending a control signal to the IP part 120 when a CPU congestion has happened, in addition to functions of a former IP routing part 2031 (see FIG. 20).

Operations of these functional blocks 110, 120, and 121 are described with reference to FIGS. 2 to 4 in the following.

Figure 2:
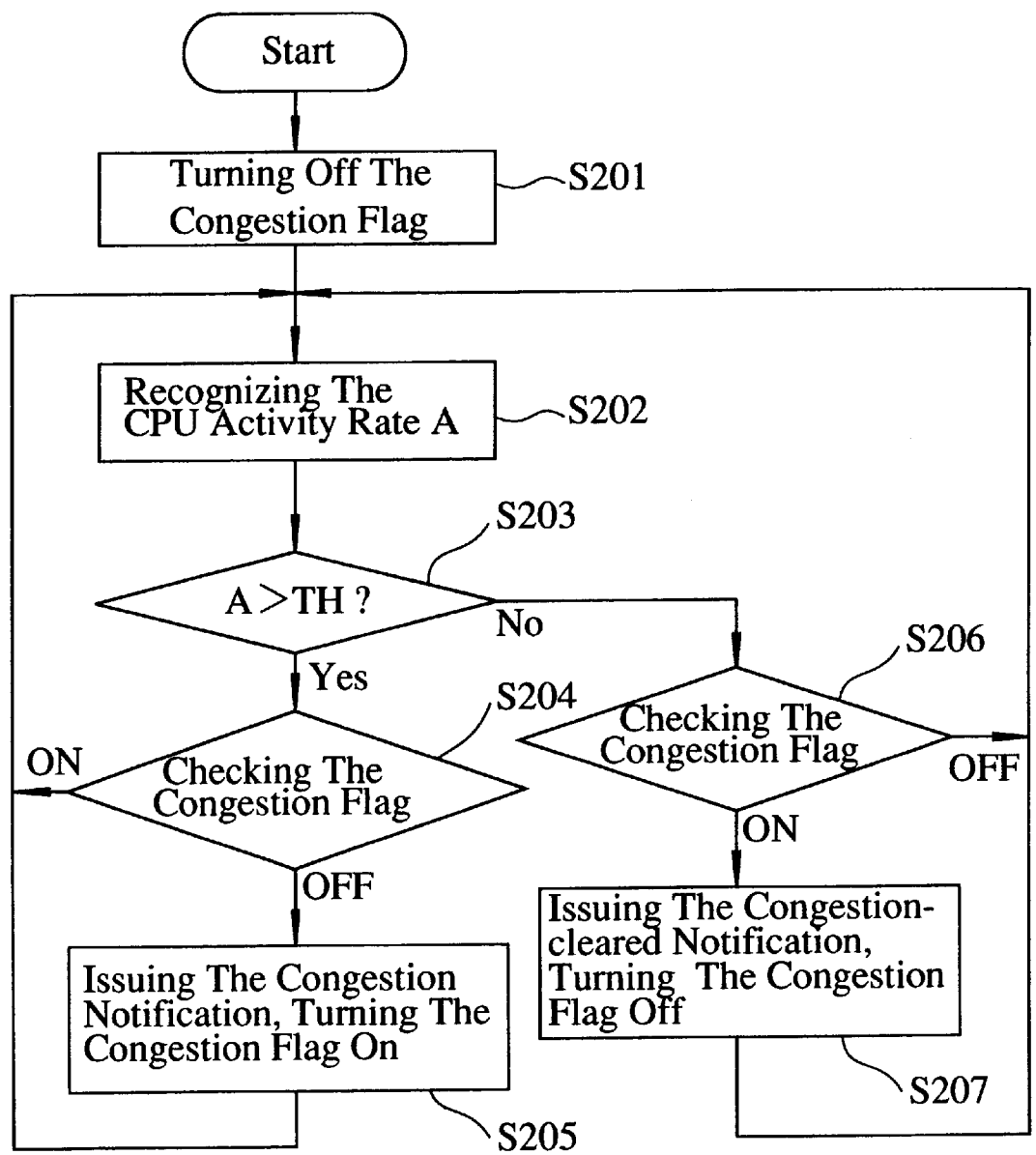
FIG. 2 is a flowchart for explaining an example of concrete operations of a congestion monitoring part shown in FIG. 1.

FIG. 2 is a flowchart for explaining an example of concrete operations of the congestion monitoring part 110.

The congestion monitoring part 110 starts a process at the time of resetting the ATM switching apparatus 1801 (see FIG. 18) or turning power on.

In this process, the congestion monitoring part 110 first turns off a CPU congestion flag (not illustrated) as an initializing operation (S201).

Then the congestion monitoring part 110 calculates a CPU activity rate A by means of the above-mentioned calculating part (S202), and compares the calculated CPU activity rate A with a congestion judging threshold value TH (S203). Hereupon, in case that the CPU activity rate A is larger than the congestion judging threshold value TH, the congestion monitoring part 110 checks a state of the above-mentioned CPU congestion flag (S204). Hereupon, in case that the CPU congestion flag is off, the congestion monitoring part 110 issues a CPU congestion notification to the IP routing 121 and after this, turns on the CPU congestion flag (S205), and then returns to step S202. On the other hand, in case that the CPU congestion flag has already been on in step S204, the congestion monitoring part 110 returns to step S202 without performing step S205. According to these steps S204 and S205, it is possible to issue a CPU congestion notification only immediately after a CPU congestion has happened, namely, it is possible to avoid that the congestion notifications are consecutively issued even in case that a CPU congestion state is continued for a certain period of time.

On the other hand, in case that the CPU activity rate A is not greater than the congestion judging threshold value TH in step S203, the congestion monitoring part 110 then checks a state of the CPU congestion flag (S206). Hereupon, in case that the CPU congestion flag is on, the congestion monitoring part 110 issues a CPU congestion-cleared notification to the IP routing part 121 and then turns off the CPU congestion flag (S207) and returns to step S202. On the other hand, in case that the CPU congestion flag has been already off in step S206, the congestion monitoring part 110 returns to step S202 without performing step S207. According to the processes of these steps S204 and S205, it is possible to issue a CPU congestion cleared notification only immediately after a CPU congestion has been cleared, namely, it is possible to avoid that the congestion-cleared notifications are consecutively issued even in case that a CPU congestion cleared state is continued for a certain period of time.

FIG. 3 is a flowchart for explaining an example of operations of the IP routing part 121.

Figure 21:
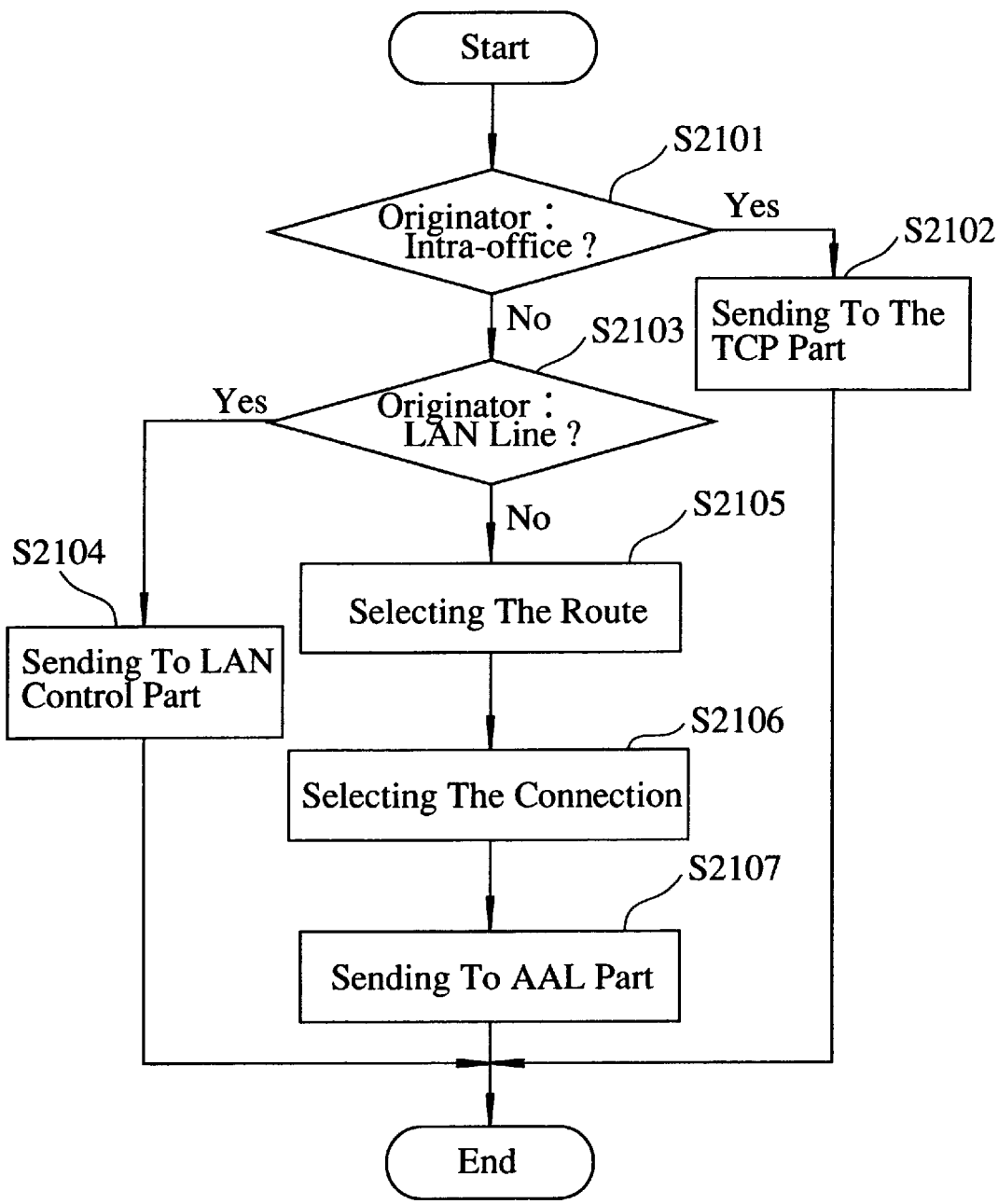
FIG. 21 is a flowchart for explaining an example of concrete operations of an IP routing part shown in FIG. 18.

The IP routing part 121 performs a process shown in FIG. 21 in the same way as the former IP routing part 2031 (not shown in FIG. 3).

Figure 3A:
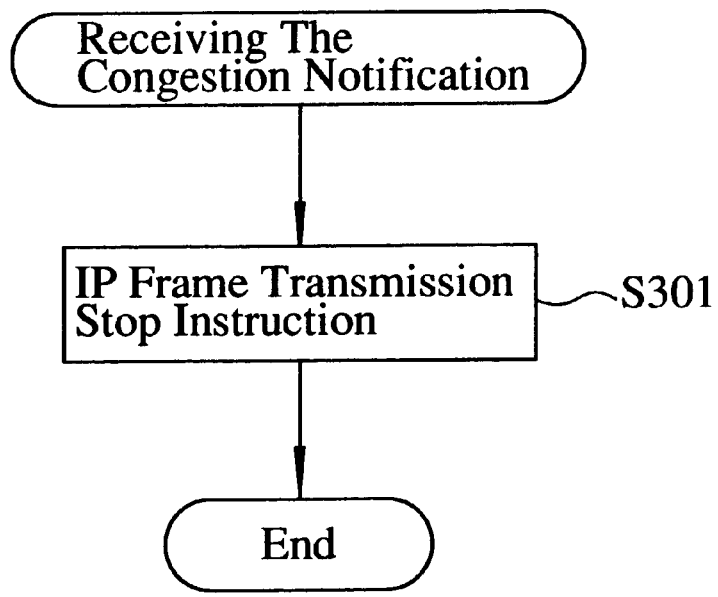
FIG. 3 is a flowchart for explaining an example of concrete operations of an IP routing part shown in FIG. 1.

Then, in case that the IP routing part 121 has received a CPU congestion notification from the congestion monitoring part 110, the IP routing part 121 sends an IP frame transmission-stop instruction to the IP part 120 as an interrupt instruction (S301 in FIG. 3(A)). The IP part 120 has a transmission-stop flag in it and turns on this transmission-stop flag when it has received an IP frame transmission-stop instruction.

Figure 3B:
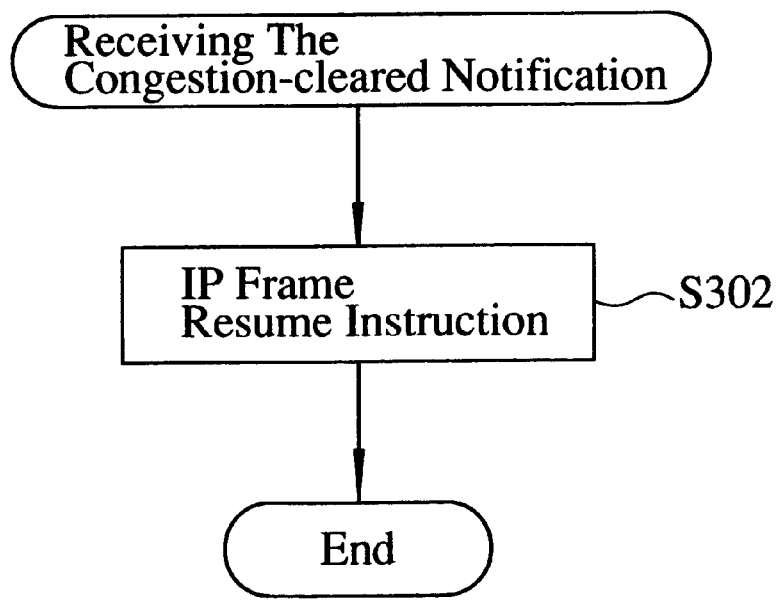

On the other hand, in case that the IP routing part 121 has received a CPU congestion cleared notification from the congestion monitoring part 110, the IP routing part 121 sends an IP frame transmission-resume instruction to the IP part 120 as an interrupt instruction (S302 in FIG. 3(B)). The IP part 120 turns off the transmission-stop flag when it has received the IP frame transmission-resume instruction.

FIG. 4 is a flowchart for explaining operation of the IP part 120.

When the IP part 120 has received an IP frame from the LAN control part 2010 or the TCP part 2040, the IP part 120 first checks a state of the transmission-stop flag provided in it (S401).

In case that the transmission-stop flag is on, the IP part 120 discards the received IP frame (S402).

On the other hand, in case that the transmission-stop flag is off in step S401, the IP part 120 transfers the received IP frame to the IP routing part 121 (S403). The IP routing part 121 performs a process shown in FIG. 21 when it receives the IP frame.

Due to this, the ATM switching apparatus discards the received IP frame in case that the transmission-stop flag is on (namely, in case that the CPU activity rate A is larger than the congestion judging threshold value TH), and sends the received IP frame in case that the transmission-stop flag is off (namely, in case that the CPU activity rate A is not larger than the congestion judging threshold value TH).

As described above, an ATM switching apparatus according to this embodiment can monitor the CPU activity rate A by means of the congestion monitoring part 110, and can discard an IP frame received from the LAN control part 2010 when the CPU comes into a congestion state. Therefore, an ATM switching apparatus according to this embodiment can lower the CPU activity rate A and can reduce a load on the CPU in case that the CPU activity rate A has become larger than the congestion judging threshold value TH.

That is to say, according to an ATM switching apparatus of this embodiment, it is possible to make it easy to avoid a CPU congestion state. This embodiment is particularly effective in case that the reason why the CPU activity rate A increases is that the number of IP frames received from a LAN line increases.

Although this embodiment takes both of a group of IP frames received from the LAN line side and a group of IP frames to be sent to the LAN line as the object of discarding, it is a matter of course that only one group out of them may be taken as the object of discarding.

And although this embodiment avoids a CPU congestion state only by discarding IP frames, an ATM switching apparatus can be composed so as to make it possible to discard both of IP frames and ATM cells (namely, so as to be provided with both of a discarding means of the present invention and a discarding means of the prior art). Moreover, in this case, it is possible also to determine which group should be discarded, a group of IP frames or a group of ATM cells according to the cause or the degree of increase of the CPU activity rate A. For example, ATM cells may be discarded when the degree of CPU congestion is a little, and IP frames may be discarded when the degree of CPU congestion is great.

Additionally in this embodiment, although a case where a packet switching apparatus according to the present invention is applied to a communication network in which an ATM network and a LAN are connected with one another has been described as an example, the kind of communication networks is not limited to this. For example, it is possible also to apply the present invention to a packet switching apparatus in a communication network where a packet switching network other than an ATM network and a LAN are connected with each other, and furthermore it is possible also to apply the present invention to an ATM switching apparatus in a communication network where an ATM network and a WAN (wide area network) are connected with each other.

Second Embodiment

Next, a case where a packet switching apparatus according to a second embodiment of the present invention is applied to an ATM switching apparatus is described as an example.

An ATM switching apparatus according to this embodiment is different from the above-mentioned first embodiment in that the CPU activity rate A (the degree of CPU congestion) is classified into plural levels and the kind of IP frames to be discarded is selected according to these levels, and that an ARP table of the IP routing part is used in discarding IP frames.

The ATM switching apparatus according to this embodiment is the same as a former ATM switching apparatus (see FIG. 19) in hardware configuration, but it is different from the former apparatus in an IP frame transferring function performed by the CPU 1950.

Figure 5:
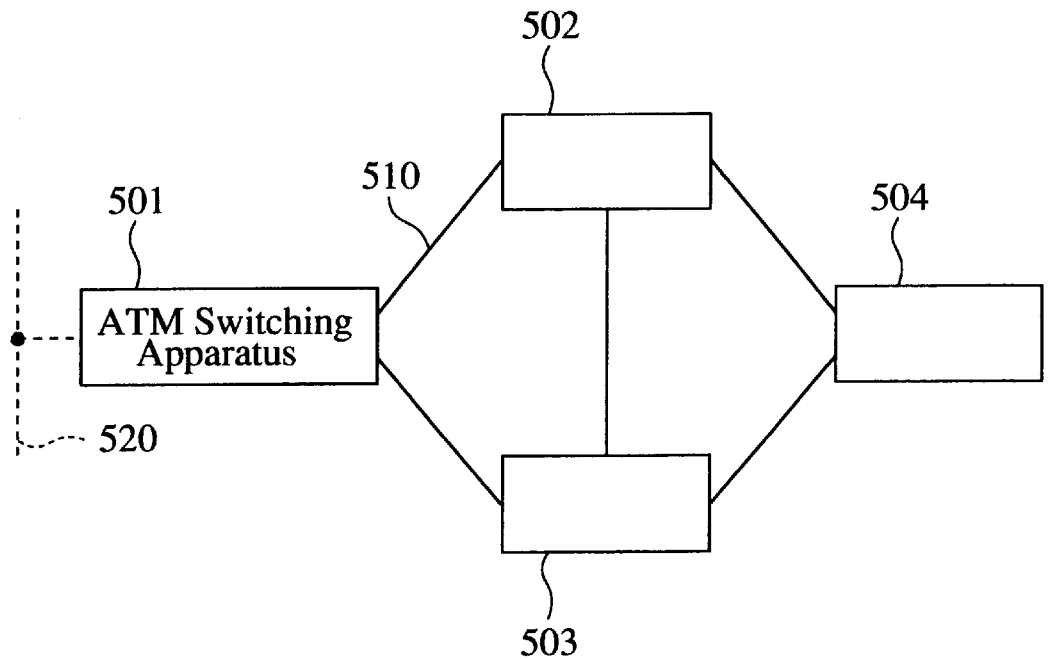
FIG. 5 is a conceptual diagram showing composition of a communication network according to a second embodiment of the invention.

FIG. 5 is a conceptual diagram showing composition of a communication network in this embodiment.

In FIG. 5, an ATM switching apparatus 501 is an ATM switching apparatus according to this embodiment, and is connected to a LAN terminal (not illustrated) through a LAN line 520. On the other hand, each of ATM switching apparatuses 502, 503 and 504 is a switching apparatus of a type accommodating no LAN line. These ATM switching apparatuses 501 to 504 are connected with one another through ATM lines 510. That is to say, communication between the ATM switching apparatuses 502 to 504 and a LAN terminal is performed through the ATM switching apparatus 501 according to this embodiment.

Figure 6:
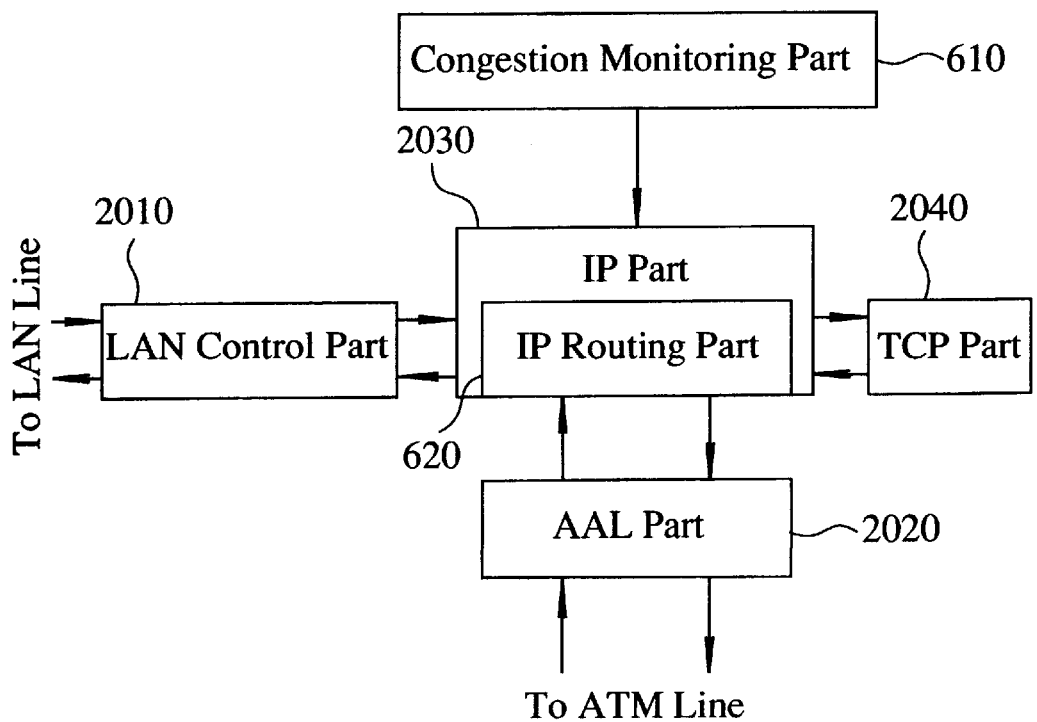
FIG. 6 is a functional block diagram for explaining a communication function of an ATM switching apparatus according to a second embodiment of the invention.

FIG. 6 is a functional block diagram for explaining a communication function of the ATM switching apparatus 501 according to this embodiment. In FIG. 6, since blocks to which the same symbols as the former functional blocks (see FIG. 20) are given have respectively the same functions as blocks of a former ATM switching apparatus, description of them is omitted. FIG. 6 also shows a case where the TCP/IP protocol is used as a LAN protocol in the same way as FIG. 20.

In FIG. 6, a congestion monitoring part 610 has a calculating section (not illustrated) for calculating a CPU activity rate A, and always monitors the CPU activity rate A by means of this calculating part (it is the same as the first embodiment in this point). And the congestion monitoring part 610 judges whether or not the CPU 1950 is in a congestion state and judges a level of the congestion state by comparing the CPU activity rate A and the congestion judging threshold values of plural levels with each other. In this embodiment, a case of using values TH1, TH2 and TH3 of three levels as the congestion judging threshold values is described as an example.

The IP routing part 620 is provided with a function of discarding an IP frame when a CPU congestion has happened, in addition to the functions of the former IP routing part 2031 (see FIG. 20). This IP routing part 620 is provided with an IP address table (as described later), and discards an IP frame by rewriting an ARP table by means of the IP address table.

Operations of these functional blocks 610 and 620 are described with reference to FIGS. 7 to 12 in the following.

Figure 7:
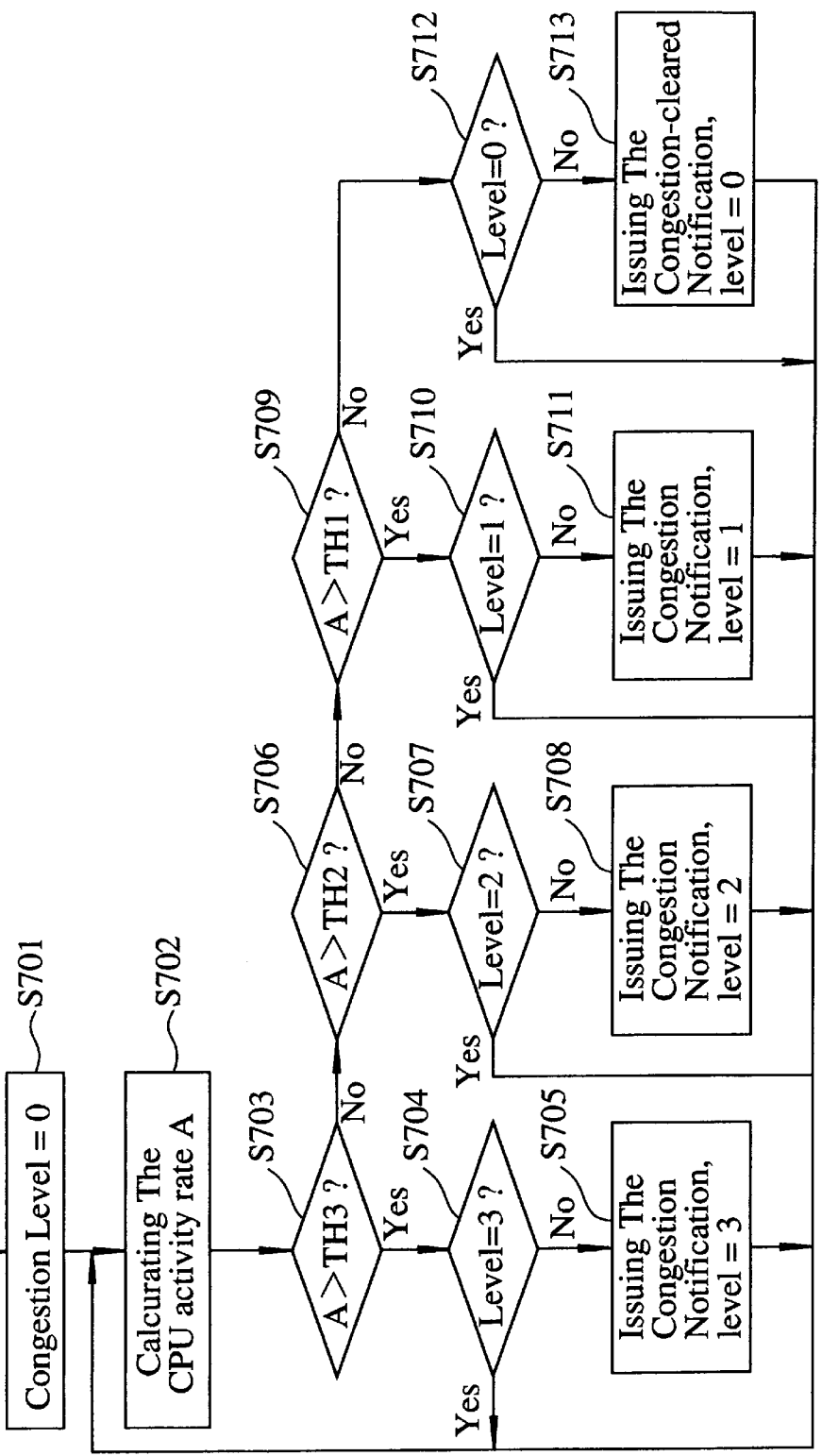
FIG. 7 is a flowchart for explaining an example of concrete operations of a congestion monitoring part shown in FIG. 6.
Figure 9:
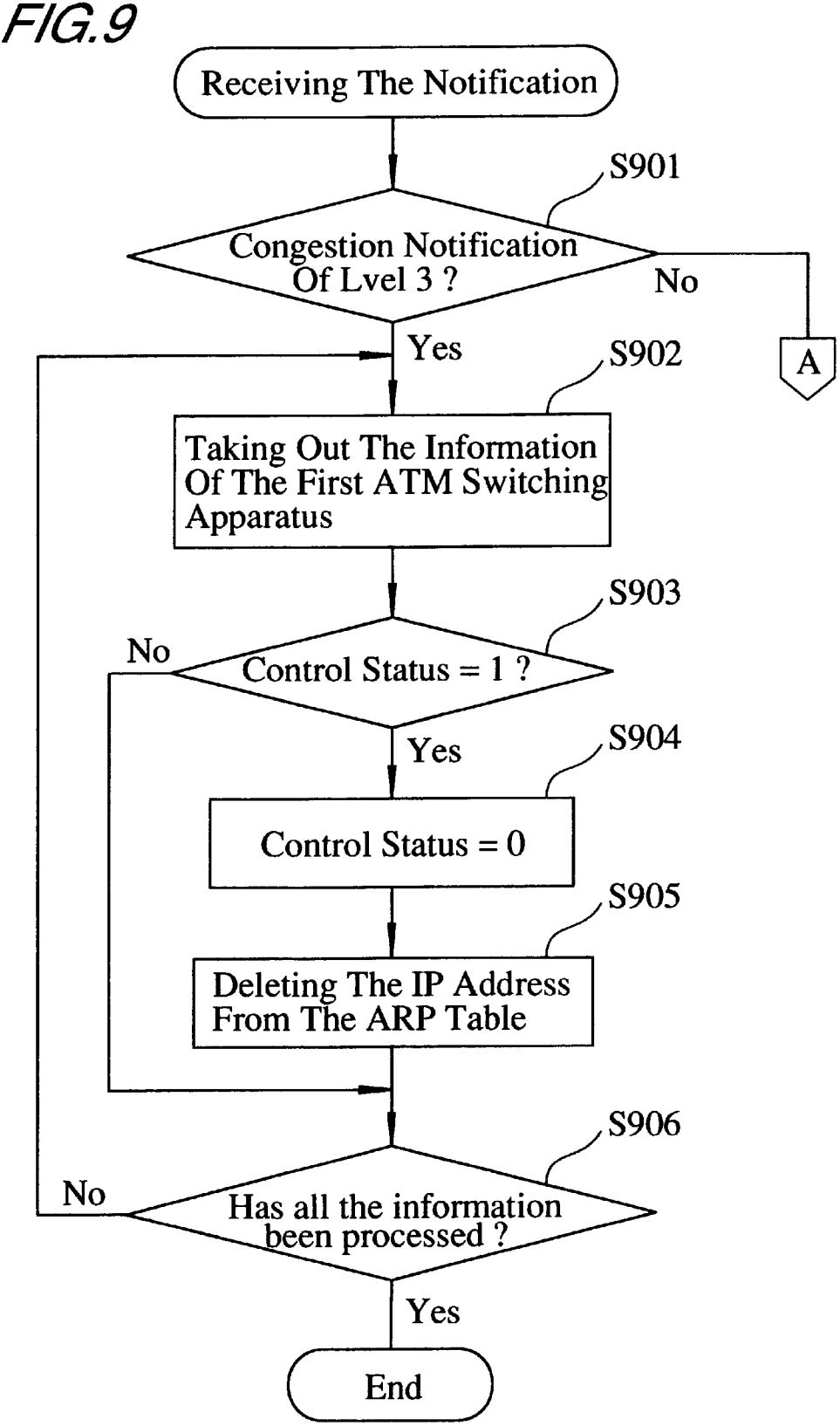
FIG. 9 is a flowchart for explaining an example of concrete operations of an IP routing part shown in FIG. 6.
Figure 10:
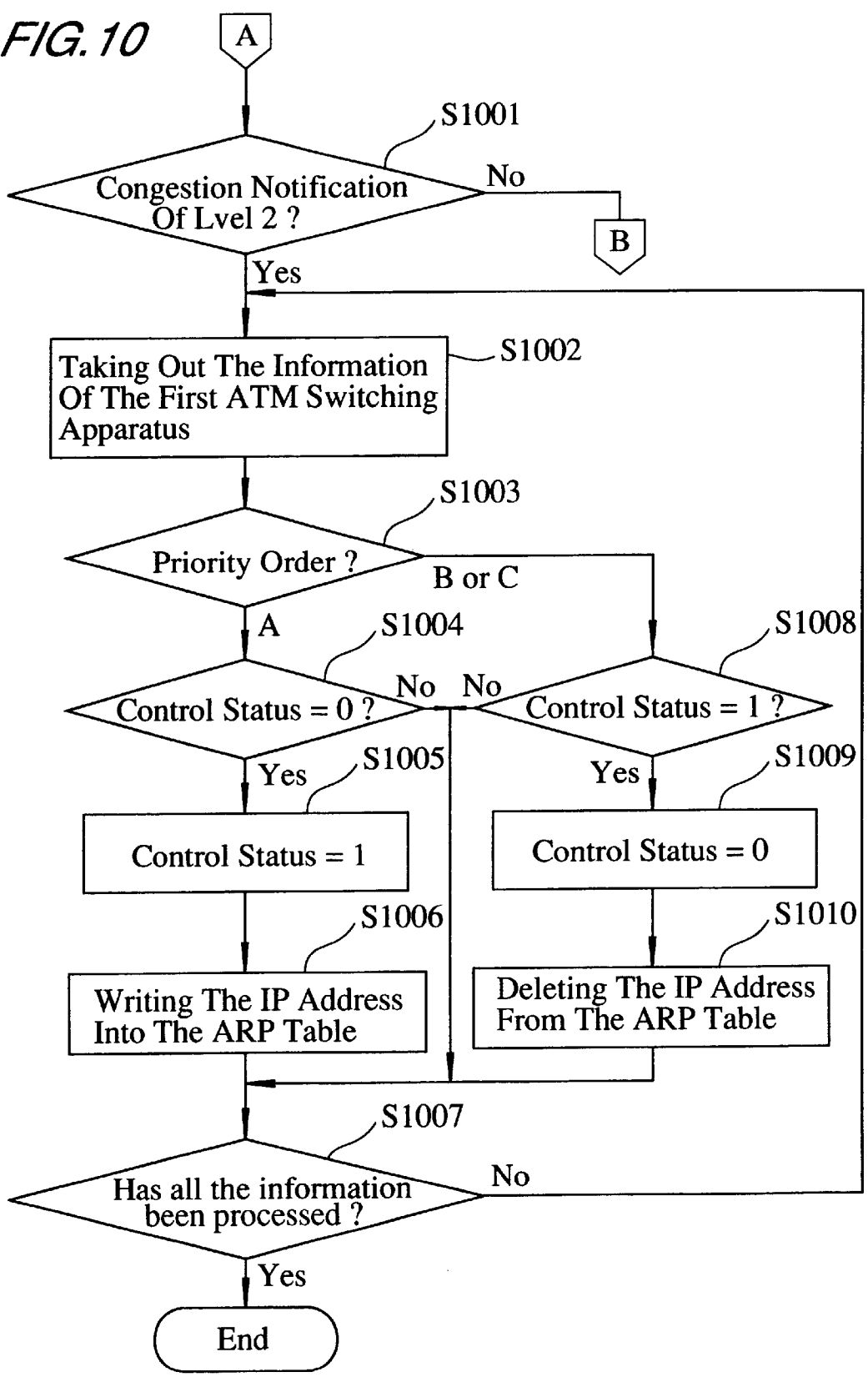
FIG. 10 is a flowchart for explaining an example of concrete operations of an IP routing part shown in FIG. 6.
Figure 11:
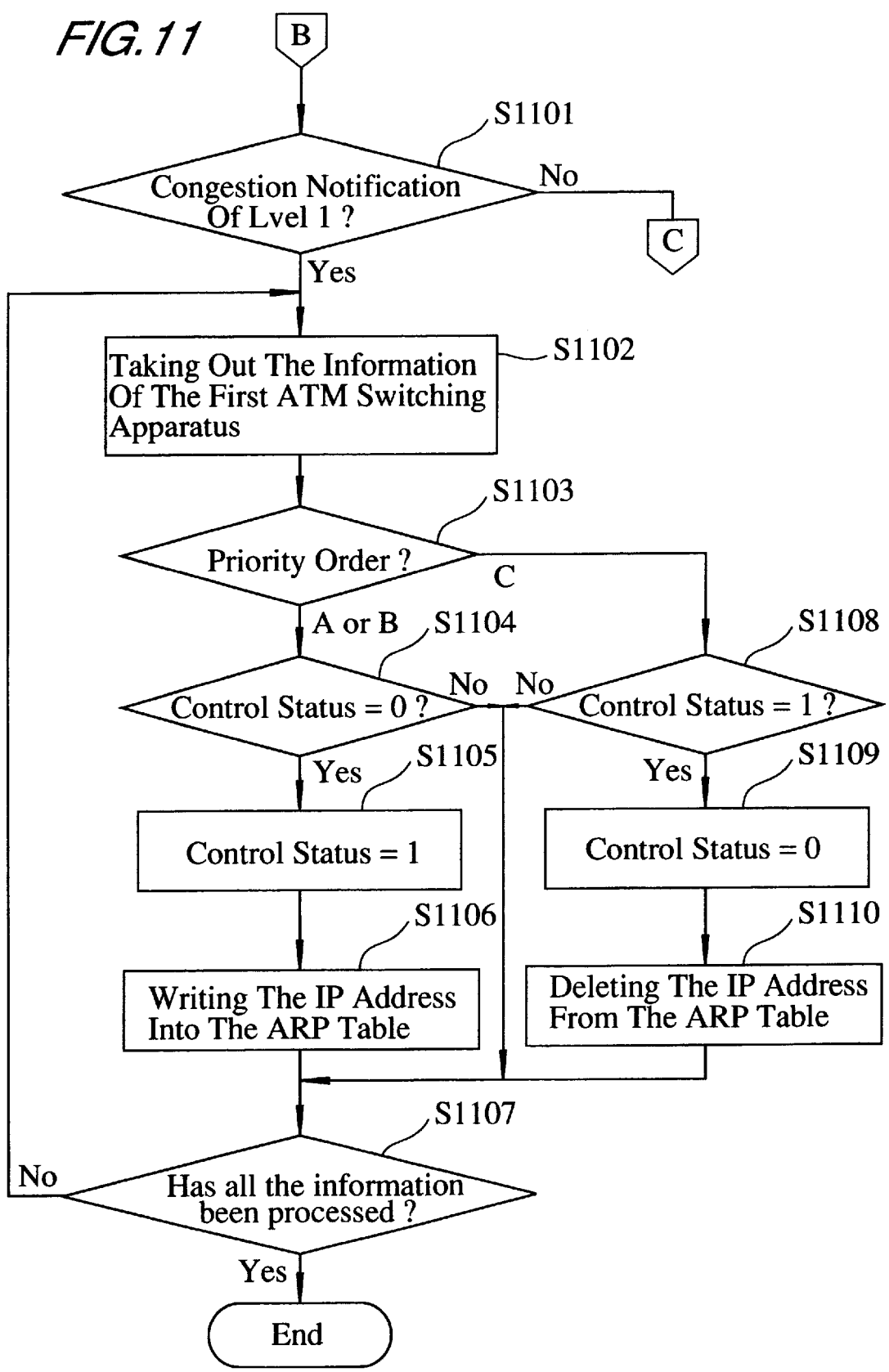
FIG. 11 is a flowchart for explaining an example of concrete operations of an IP routing part shown in FIG. 6.
Figure 12:
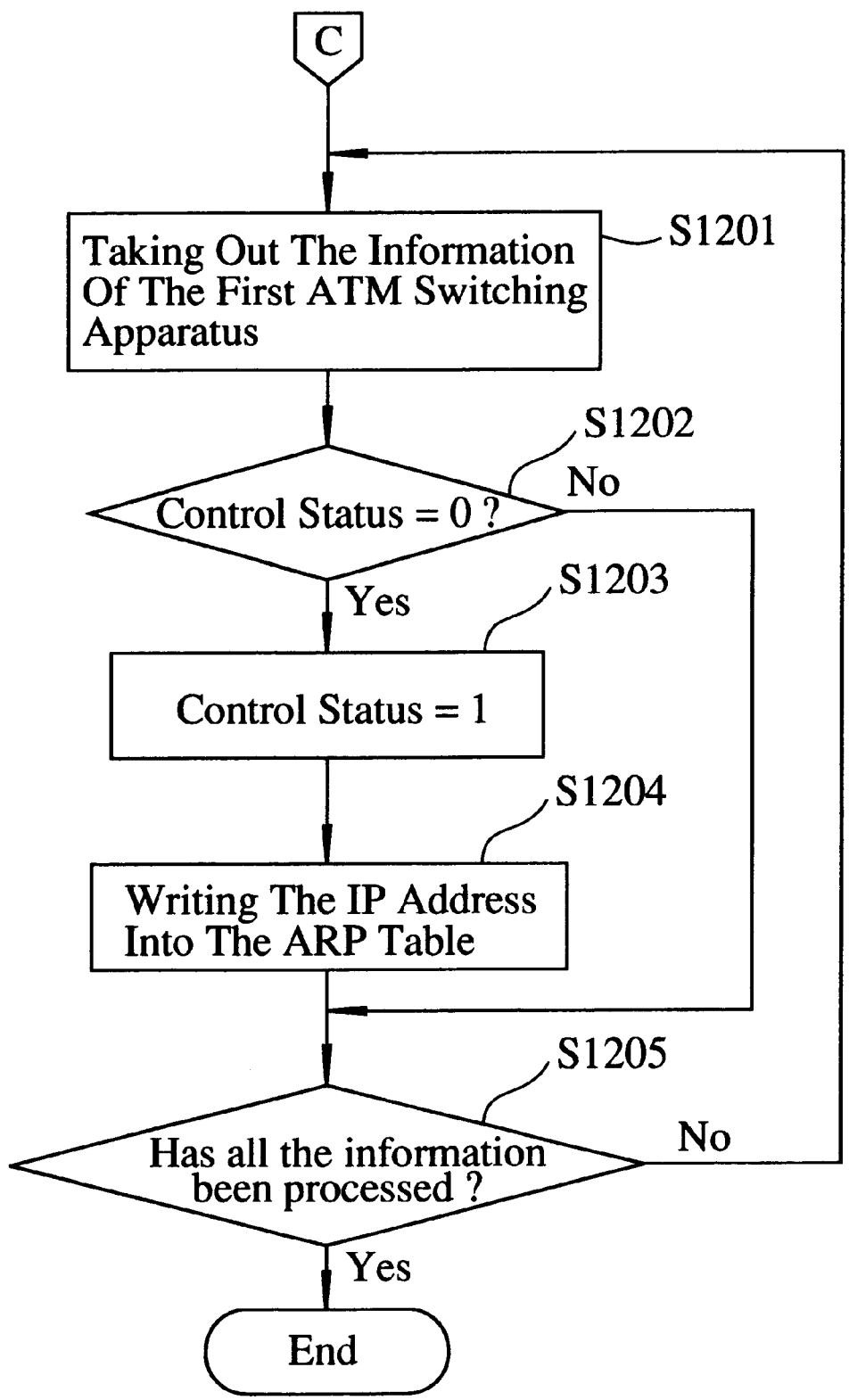
FIG. 12 is a flowchart for explaining an example of concrete operations of an IP routing part shown in FIG. 6.

FIG. 7 is a flowchart for explaining an example of concrete operations of the congestion monitoring part 610. In the following description, the congestion judging threshold values are, respectively, assumed to be TH1=70 (%), TH2=80 (%), and TH3=90 (%).

The congestion monitoring part 610 starts a process at the time of resetting the ATM switching apparatus 501 or turning power on.

In this process, the congestion monitoring part 610 first stores "0" as a CPU congestion level in a CPU congestion level storing area (not illustrated) inside it as the initializing operation (S701). Here, the congestion level "0" shows that the CPU 1950 is not in a congestion state.

Next, the congestion monitoring part 610 calculates a CPU activity rate A (S702). Following this, the congestion monitoring part 610 compares the calculated CPU activity rate A and the congestion judging threshold value TH3 with each other (S703), and in case that this CPU activity rate A is larger than the congestion judging threshold value TH3, the congestion monitoring part 610 checks a set value of the CPU congestion level (S704). And in case that this CPU congestion level is not "3" (namely, in case that this CPU congestion level is "0", "1" or "2"), the congestion monitoring part 610 sends a CPU congestion notification of level 3 to the IP routing part 620 and changes a value stored in the CPU congestion level storing area inside it to "3" (S705), and then performs again processes in and after step S702. In case that the CPU congestion level is "3" in step S704, the congestion monitoring part 610 performs processes in and after step S702 as they are.

On the other hand, in case that the CPU activity rate A is not larger than the congestion judging threshold value TH3 in step S703, the congestion monitoring part 610 then compares this CPU activity rate A with the congestion judging threshold value TH2 (S706). In case that this CPU activity rate A is larger than the congestion judging threshold value TH2, the congestion monitoring part 610 checks a set value of the CPU congestion level (S707). Here, in case that this CPU congestion level is not "2" (namely, in case that this CPU congestion level is "0","1" or "3"), the congestion monitoring part 610 sends a CPU congestion notification of level 2 to the IP routing part 620 and changes a value stored in the CPU congestion level storing area inside it to "2" (S705), and then performs again processes in and after step S702. In case that the CPU congestion level is "2" in step S707, the congestion monitoring part 610 performs processes in and after step S702 as they are.

In case that the CPU utilization rate A is not larger than the congestion judging threshold value TH2 in step S706, the congestion monitoring part 610 then compares this CPU activity rate A with the congestion judging threshold value TH1 (S709). And in case that this CPU activity rate A is larger than the congestion judging threshold value TH1, the congestion monitoring part 610 checks a set value of the CPU congestion level (S710). Here, in case that this CPU congestion level is not "1" (namely, in case that this CPU congestion level is "0","2" or "3"), the congestion monitoring part 610 sends a CPU congestion notification of level 1 to the IP routing part 620 and changes a value stored in the CPU congestion level storing area inside it to "1" (S711), and then performs again processes in and after step S702. On the other hand, in case that the CPU congestion level is "1" in step S710, the congestion monitoring part 610 performs processes in and after step S702 as they are.

In case that the CPU utilization rate A is not larger than the congestion judging threshold value TH1 in step S709, the congestion monitoring part 610 checks a set value of the CPU congestion level (S710). Here, in case that this CPU congestion level is not "0" (namely, in case that this CPU congestion level is "1","2" or "3"), the congestion monitoring part 610 sends a CPU congestion cleared notification to the IP routing part 620 and changes a value stored in the CPU congestion level storing area inside it to "0" (S711), and then performs again processes in and after step S702. In case that the CPU congestion level is "0" in step S710, the congestion monitoring part 610 performs processes in and after step S702 as they are.

By such operations, it is possible to make the congestion monitoring part 610 send a CPU congestion notification of level 3 in case of "A>TH3", a CPU congestion notification of level 2 in case of "TH3≧A>TH2", a CPU congestion notification of level 1 in case of "TH2≧A>TH1", and a CPU congestion cleared notification in case of "TH1≧A".

Next, functions and operation of the IP routing part 620 are described with reference to FIGS. 8 to 12.

The IP routing part 620 in the second embodiment performs a process shown in FIG. 21 in the same way as the former IP routing part 2031. This IP routing part 620 coincides with the former IP routing part 2031 in that each of them is provided with an ARP table (not illustrated).

This ARP table has IP addresses of other ATM switching apparatuses 502 to 504 (see FIG. 5) and IP addresses of LAN terminals stored in it. And the ATM switching apparatus 501 accepts, by performing a MAC layer, only communication with an ATM switching apparatus or a LAN terminal whose IP address is stored in this ARP table, but does not accept communication with an ATM switching apparatus or a LAN terminal whose IP address is not stored in this ARP table.

This IP routing part 620 is different from the former IP routing part 2031 in that this is provided with an IP address table.

FIG. 8 is a conceptual diagram showing composition of an IP address table provided in the IP routing part 620 according to this embodiment.

As shown in FIG. 8, this table has IP addresses and ATM addresses of the ATM switching apparatuses 501 to 504 stored in it, and has a priority order and a control status for each of the ATM switching apparatuses 501 to 504 stored in it.

Here, IP addresses stored in the IP address table are the same as the IP addresses which are stored in the ARP address table at the time of resetting the ATM switching apparatus 501 or turning power on. As described later, an IP address stored in the ARP address table is deleted or reregistered due to an IP frame discarding control, but an IP address and an ATM address stored in the IP address table are not deleted or reregistered after they have been registered once.

A "priority order" in the IP address table shows the priority order in transferring IP frames. The priority order A shows that an IP frame is discarded only when a CPU congestion level value is "3", the priority order B shows that an IP frame is discarded when a CPU congestion level value is "2" or "3", and the priority order C shows that an IP frame is discarded when a CPU congestion level value is one of "1" to "3". In FIG. 8, the priority order of the ATM switching apparatus 501 is set at A, the priority order of each of the ATM switching apparatuses 502 and 503 is set at B, and the priority order of the ATM switching apparatus 504 is set at C. Accordingly, any IP frame addressed to one of the ATM switching apparatuses 501 to 504 are discarded when the value of a CPU congestion level is "3", IP frames addressed to one of the ATM switching apparatuses 502 to 504 are discarded when the value of a CPU congestion level is "2", and only IP frames addressed to the ATM switching apparatus 504 are discarded when the value of a CPU congestion level is "1". And an IP frame addressed to any of the ATM switching apparatuses 501 to 504 is not discarded when the value of a CPU congestion level is "0".

A method for determining the priority order is not limited in particular, and it will do to determine the priority order in consideration of the number of ATM terminals connected to the ATM switching apparatuses 501 to 504, the kind of communication data (voice, image, or data), and the like. For example, such a priority order determining method as a method of making high the priority order of an ATM switching apparatus which many ATM terminals are connected with, or a method of making high the priority order of an ATM switching apparatus which many ATM terminals handling voice data are connected with can be thought.

A "control status" of the IP address table shows whether or not an IP address described in the IP address table is stored in the ARP table. In this embodiment, a "control status" is set at "1" in case that an IP address is stored in the ARP table, and a "control status" is set at "0" in case that an IP address is not stored in the ARP table.

A concrete example of operation of the IP routing part 620 is described in the following.

When the IP routing part 620 has received a congestion notification or a congestion-cleared notification from the congestion monitoring part 610, the IP routing part 620 first judges whether or not this notification is a congestion notification of level 3 (S901). In case that it has determined that this notification is a congestion notification of level 3, the congestion monitoring part 610 performs settings for discarding any IP frame corresponding to one of all the IP addresses in the following manner.

The IP routing part 620 first reads out information of the first ATM switching apparatus (information of the ATM switching apparatus 501 in this case) from the IP address table (see FIG. 8) (S902), and judges the value of a "control status" of this ATM switching apparatus 501 (S903). Hereupon, in case that a "control status" is "1" (namely, in case that the IP address of this ATM switching apparatus 501 is stored in the ARP table), the IP routing part 620 changes this "control status" to "0" (S904) and then deletes this IP address from the ARP table (S905), and further checks whether or not a status processing for each of the ATM switching apparatuses 501 to 504 has been finished (S906). On the other hand, in case that a "control state" is "0" in step S903 (namely, in case that the IP address of this ATM switching apparatus 501 is not stored in the ARP table), the IP routing part 620 immediately checks whether or not a status processing for each of the ATM switching apparatuses 501 to 504 has been finished (S906). In case that the IP routing part 620 has judged that a status processing for each of the ATM switching apparatuses 501 to 504 has been finished (S906), the IP routing part 620 ends the process. In case that the IP routing part 620 has judged that there are one or more ATM switching apparatuses for which a status processing has not been finished in step S906, the IP routing part 620 performs again processes in and after step S902.

By doing so, the IP routing part 620 can delete the IP addresses of all the ATM switching apparatuses from the ARP table.

In step S901, in case that the IP routing part 620 has judged that a received notification is not a congestion notification of level 3, the IP routing part 620 then judges whether or not this notification is a congestion notification of level 2 (S1001). And in case that the IP routing part 620 has judged that this notification is a congestion notification of level 2, in the following manner the IP routing part 620 performs settings for discarding an IP frame corresponding to the IP address whose "priority order" is "B" or "C".

The IP routing part 620 first reads out information of the first ATM switching apparatus (information of the ATM switching apparatus 501 in this case) from the IP address table (S1002), and judges the "priority order" of this ATM switching apparatus 501 (S1003). In case that the "priority order" is "A", the IP routing part 620 then judges the value of a "control status" of this ATM switching apparatus (S1004). Hereupon, in case that the "control status" is "0" (namely, in case that the IP address of this ATM switching apparatus is not stored in the ARP table), the IP routing part 620 changes this "control status" to "1" (S1005) and then writes this IP address into the ARP table (S1006), and performs step S1007 (as described later). On the other hand, in case that a "control status" is "1" in step S1004 (namely, in case that the IP address of this ATM switching apparatus is stored in the ARP table), the IP routing part 620 immediately performs step S1007 (as described later). By doing so, the IP routing part 620 can store all of the IP addresses having the "priority order" of "A" into the ARP table.

In case that the "priority order" is "B" or "C" in step S1003, the IP routing part 620 then judges the value of a "control status" of this ATM switching apparatus (S1008). Hereupon, in case that the "control status" is "1" (namely, in case that the IP address of this ATM switching apparatus is stored in the ARP table), the IP routing part 620 changes this "control status" to "0" (S1009) and then deletes this IP address from the ARP table (S1010), and performs step S1007 (as described later). On the other hand, in case that the "control status" is "0" in step S1004 (namely, in case that the IP address of this ATM switching apparatus is not stored in the ARP table), the IP routing part 620 immediately performs step S1007 (as described later). By doing so, the IP routing part 620 can delete all of the IP addresses having the "priority order" of "B" or "C" from the ARP table.

In step S1007, the IP routing part 620 judges whether or not a status processing for each of the ATM switching apparatuses 501 to 504 has been finished. And in case that the IP routing part 620 has judged that a status processing for each of the ATM switching apparatuses 501 to 504 has been finished, the IP routing part 620 ends the process. In case that the IP routing part 620 has judged that there are one or more ATM switching apparatuses for which a status processing has not been finished in step S1007, the IP routing part 620 performs again processes in and after step S1002.

In step S1001, in case that the IP routing part 620 has judged that a received notification is not a congestion notification of level 2, the IP routing part 620 then judges whether or not this notification is a congestion notification of level 1 (S1101). And in case that the IP routing part 620 has judged that this notification is a congestion notification of level 1, in the following manner the IP routing part 620 performs settings for discarding an IP frame corresponding to the IP address having the "priority order" of "C".

The IP routing part 620 first reads out information of the first ATM switching apparatus (information of the ATM switching apparatus 501 in this case) from the IP address table (S1102), and judges the "priority order" of this ATM switching apparatus (S1103). In case that the "priority order" is "A" or "B", the IP routing part 620 then judges the value of a "control status" of this ATM switching apparatus (S1104). Hereupon, in case that the "control status" is "0" (namely, in case that the IP address of this ATM switching apparatus is not stored in the ARP table), the IP routing part 620 changes this "control status" to "1" (S1105) and then writes this IP address into the ARP table (S1106), and performs step S1107 (as described later). On the other hand, in case that the "control status" is "1" in step S1104 (namely, in case that the IP address of this ATM switching apparatus is stored in the ARP table), the IP routing part 620 immediately performs step S1107 (as described later). By doing so, the IP routing part 620 can store all of the IP addresses having the "priority order" of "A" or "B" into the ARP table.

In case that the "priority order" is "C" in step S1103, the IP routing part 620 then judges the value of a "control status" of this ATM switching apparatus (S1108). Hereupon, in case that the "control status" is "1" (namely, in case that the IP address of this ATM switching apparatus is stored in the ARP table), the IP routing part 620 changes this "control status" to "0" (S1109) and then deletes this IP address from the ARP table (S1110), and performs step S1107 (as described later). On the other hand, in case that the "control status" is "0" in step S1104 (namely, in case that the IP address of this ATM switching apparatus is not stored in the ARP table), the IP routing part 620 immediately performs step S1107 (as described later). By doing so, the IP routing part 620 can delete all of the IP addresses having the "priority order" of "C" from the ARP table.

In step S1107, the IP routing part 620 judges whether or not a status processing for each of the ATM switching apparatuses 501 to 504 has been finished. And in case that the IP routing part 620 has judged that a status processing for each of the ATM switching apparatuses 501 to 504 has been finished, the IP routing part 620 ends the process. In case that the IP routing part 620 has judged that there are one or more ATM switching apparatuses for which a status processing has not been finished in step S1107, the IP routing part 620 performs again processes in and after step S1102.

In step S1101, in case that the IP routing part 620 has judged that a received notification is not a congestion notification of level 1, the IP routing part 620 determines that this notification is a congestion-cleared notification. And in the following manner the IP routing part 620 performs settings for transferring an IP frame corresponding to each IP address.

The IP routing part 620 first reads out information of the first ATM switching apparatus (information of the ATM switching apparatus 501 in this case) from the IP address table (S1201), and judges the value of a "control status" of this ATM switching apparatus (S1202). Hereupon, in case that the "control status" is "0" (namely, in case that the IP address of this ATM switching apparatus is not stored in the ARP table), the IP routing part 620 changes this "control status" to "1" (S1203) and then writes this IP address into the ARP table (S1204), and further checks whether or not a status processing for each of the ATM switching apparatuses 501 to 504 has been finished (S1205). On the other hand, in case that the "control status" is "1" in step S1202 (namely, in case that the IP address of this ATM switching apparatus is stored in the ARP table), the IP routing part 620 immediately checks whether or not a status processing for each of the ATM switching apparatuses 501 to 504 has been finished (S1205). And in case that the IP routing part 620 has judged that a status processing for each of the ATM switching apparatuses 501 to 504 has been finished, the IP routing part 620 ends the process. In case that the IP routing part 620 has judged that there is an ATM switching apparatus for which a status processing has not been finished in step S1205, the IP routing part 620 performs again processes in and after step S1201.

By doing so, the IP routing part 620 can register the IP addresses of all the ATM switching apparatuses at the ARP table.

As described above, an ATM switching apparatus according to this embodiment can monitor the CPU activity rate A by means of the congestion monitoring part 110 in the same way as the first embodiment, and can discard an IP frame received from the LAN control part 2010 or the TCP part 2040 when the CPU has come into a congestion state. Therefore, an ATM switching apparatus according to this embodiment can lower a CPU activity rate A and can reduce a load on the CPU.

Moreover, according to this embodiment, since it is possible to give a priority order to an IP frame to be discarded, it is possible to select an IP frame to be discarded or an IP frame not to be discarded according to the degree of importance of it. That is to say, according to this embodiment, it is possible to reduce the number of important IP frames discarded to the irreducible minimum.

Although this embodiment uses a single level congestion-cleared notification, it goes without saying that the congestion-cleared notification may be also sorted into plural levels in the same way as the congestion notification.

And this embodiment is the same as the first embodiment in that an ATM switching apparatus according to this embodiment may be composed so as to be provided with both of a discarding means of the present invention and a discarding means of the prior art, and may select which discarding means to be operated, a discarding means of the present invention or a discarding means of the prior art according to the cause or the degree of increase of the CPU activity rate A.

Additionally this embodiment is the same as the first embodiment in that it is possible also to apply this embodiment to a packet switching apparatus in a communication network other than a communication network where an ATM network and a LAN are connected with each other.

Third Embodiment

Next, a case where a packet switching apparatus according to a third embodiment of the present invention is applied to an ATM switching apparatus is described as an example.

An ATM switching apparatus according to this embodiment is different from the above-mentioned embodiments in that this apparatus is provided with a function of sending information showing that an ATM switching apparatus is in a CPU congestion state to another ATM switching apparatus and that this apparatus is provided with a function of stopping transmission of an IP frame to another ATM switching apparatus in case that this apparatus has received the information showing that the ATM switching apparatus is in a congestion state from the ATM switching apparatus.

A communication network in which an ATM switching apparatus according to this embodiment is used is similar to the network shown in FIG. 18. And the ATM switching apparatus according to this embodiment is nearly the same as a former apparatus (see FIG. 19) in hardware configuration, but it is different from the former apparatus in an IP frame transferring function performed by the CPU 1950.

Figures 13, 14:
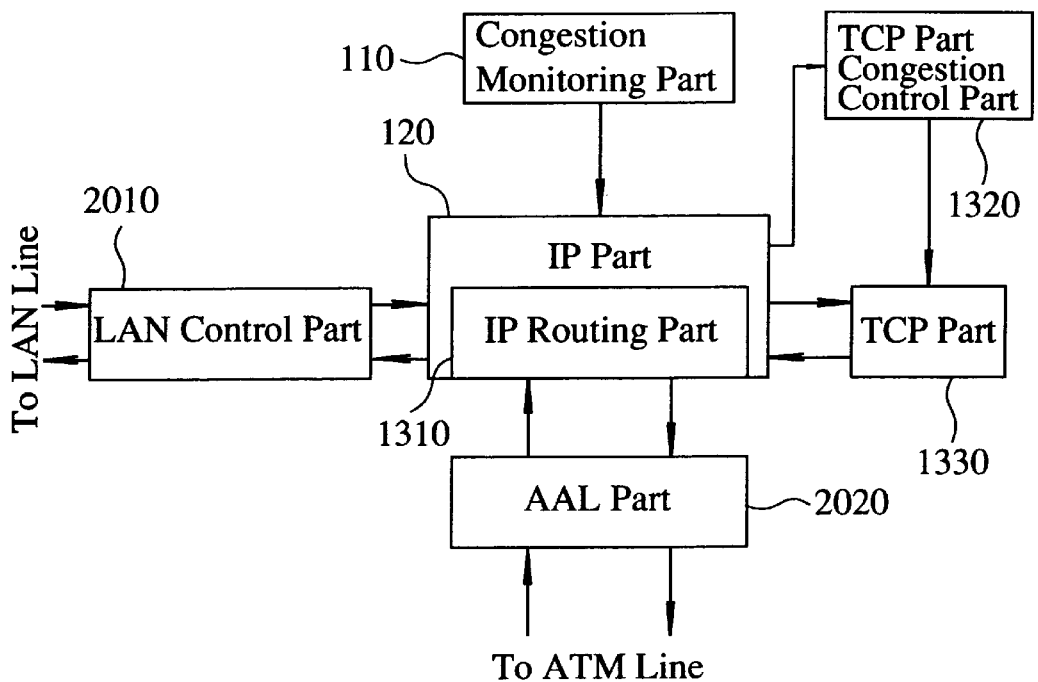
FIG. 13 is a functional block diagram for explaining a communication function of an ATM switching apparatus according to a third embodiment of the invention.
FIG. 14 is a conceptual diagram showing composition of the header of an IP frame used in the third embodiment.

FIG. 13 is a functional block diagram for explaining a communication function of the ATM switching apparatus according to this embodiment.

In FIG. 13, since blocks to which the same symbols as the former functional blocks (see FIG. 20) or the functional blocks of the first embodiment (see FIG. 1) are given have respectively the same functions as these function blocks, description of them is omitted. FIG. 13 also shows a case where the TCP/IP protocol is used as a LAN protocol in the same way as FIG. 20 or FIG. 1.

In FIG. 13, an IP routing part 1310 performs a process for sending information showing that the ATM switching apparatus is in a congestion state to an other ATM switching apparatus and a process for stopping transmission of an IP frame to another ATM switching apparatus in case that it has received from the other ATM switching apparatus the information showing that the other ATM switching apparatus is in a congestion state, in addition to an IP routing process similar to the prior art.

A TCP part congestion control part 1320 suspends or resumes a data flow control of a TCP part 1330 on the basis of a control signal received from the IP routing part 1310.

The TCP part 1330 processes a transport layer (not illustrated) by means of the data flow control. Since the data flow control itself is a publicly known technology and it is common to former ATM switching apparatuses to make the TCP part perform the data flow control, detailed description of it is omitted.

FIG. 14 is a conceptual diagram showing composition of the header of an IP frame used in this embodiment.

As shown in FIG. 14, in this embodiment, the header field of an IP frame comprises an area 1400 for showing a CPU congestion state in addition to a version area, an internet header length (IHL) area, a service-time area, an individual-data (ID) area, a time-to-leave area, a protocol area, a total-length area, a flag area, a fragment-offset area, a header-checksum area, an originator-address area, and a destination-address area which have been provided up to now.

The area 1400 for showing a congestion state may be provided in a data field instead of the header field of an IP frame.

Next, operation of an ATM switching apparatus according to this embodiment is described.

Figure 15:
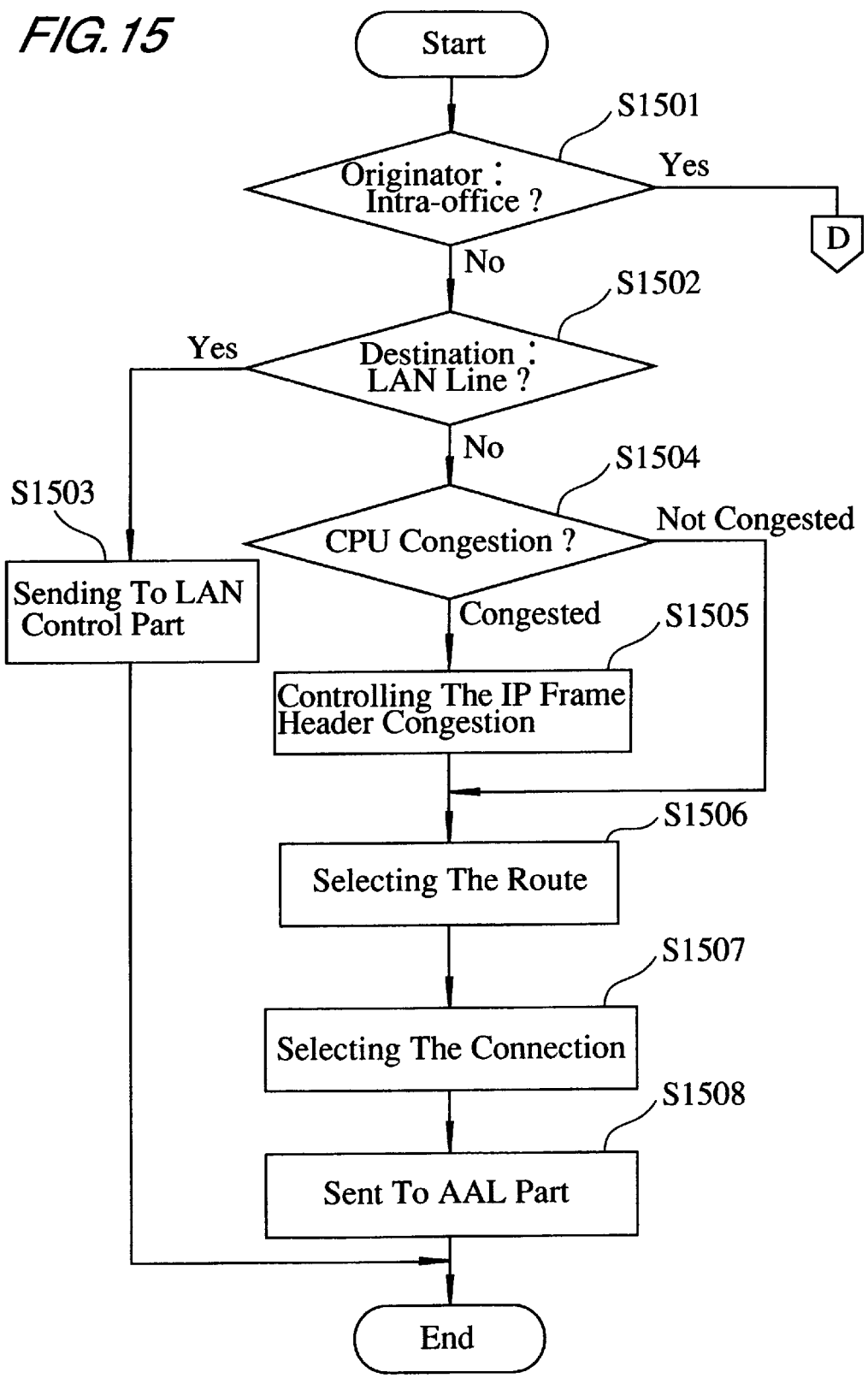
FIG. 15 is a flowchart for explaining an example of concrete operations of an IP routing part shown in FIG. 13.
Figure 16:
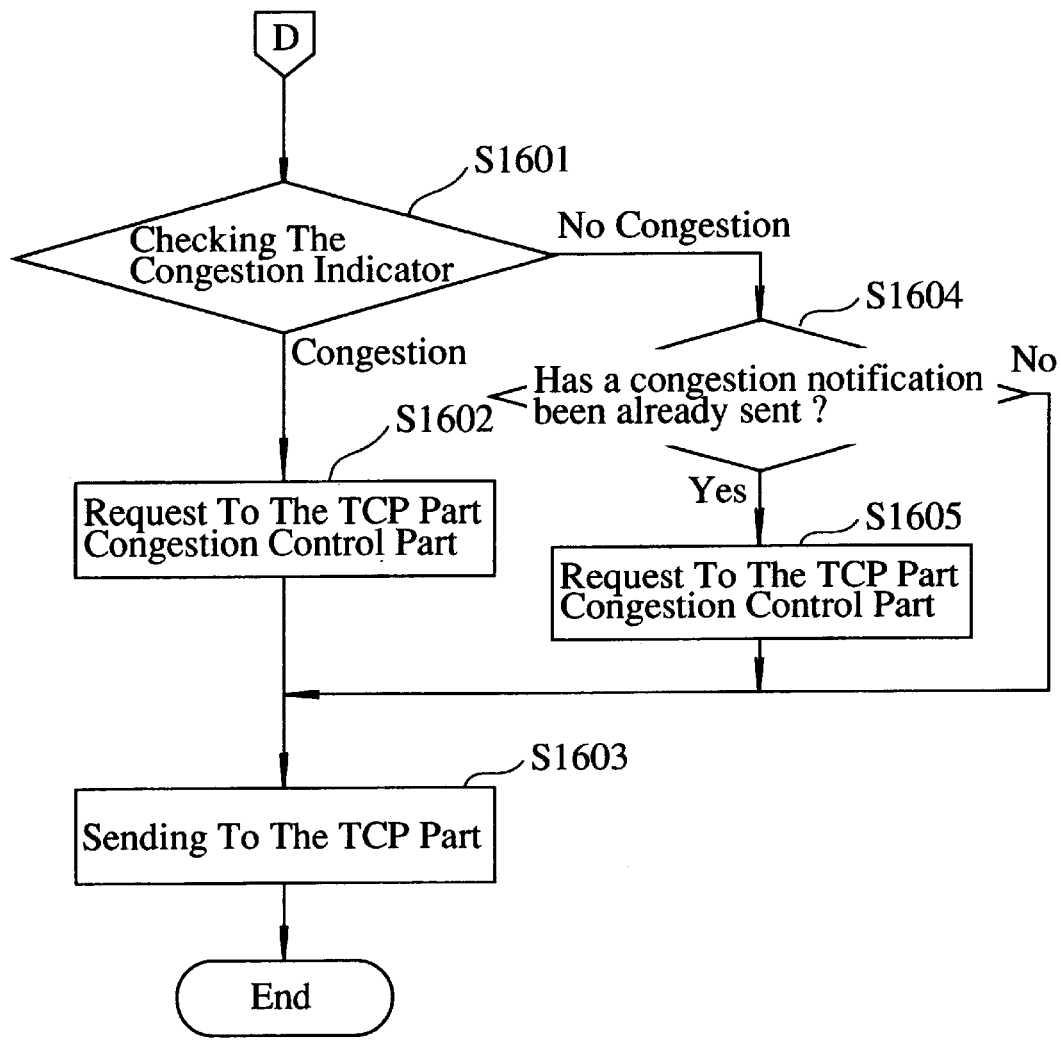
FIG. 16 is a flowchart for explaining an example of concrete operations of an IP routing part shown in FIG. 13.

FIGS. 15 and 16 are flowcharts for explaining a routing control process performed by the IP routing part 1310.

When the LAN control part 2010, the AAL part 2020, or the TCP part 1330 actually takes in an IP frame and the IP routing part 1310 (see FIG. 13) of the ATM switching apparatus 1801 (see FIG. 18) accepts this IP frame, the IP routing part 1310 starts a control process as shown in FIGS. 15 and 16.

The IP routing part 1310 first judges whether or not the destination IP address in a received IP frame coincides with the IP address of the ATM switching apparatus 1801 itself (S1501). In case that both of the IP addresses do not coincide with each other, the IP routing part 1310 then judges whether or not this destination IP address coincides with the IP address of a LAN line 1820 (namely, a LAN terminal 1804) (S1502). In case that both of these IP addresses coincide with each other, the IP routing part 1310 transfers the received IP frame to the LAN control part 2010 (S1503). After this, this IP frame is sent by control of the LAN control part 2010 to the LAN terminal 1801.

On the other hand, in case that the destination IP address does not coincide with the IP address of the LAN line 1820 in step S1502, the IP routing part 1310 then judges whether or not the ATM switching apparatus 1801 is in a CPU congestion state (S1504). This judgment is performed by receiving a CPU congestion notification from the congestion monitoring part 110 in the same way as the first embodiment. Hereupon, when the IP routing part 1310 has judged that the ATM switching apparatus 1801 is in a CPU congestion state, the IP routing part 1310 adds a congestion indicator to the header 1400 of the IP frame, as shown in FIG. 14 (see FIG. 14) (S1505).

After this, in the same way as a former case (see FIG. 21), the IP routing part 1310 performs a route selection for transferring the IP frame to other ATM switching apparatuses 1802 and 1803 (S1506), and next selects an ATM line number corresponding to the selected route and then selects a predetermined connection (S1507), and further transfers the control to the AAL part 2020 (1508). Due to this, this IP frame is sent by control of the AAL part 2020 to one of the other ATM switching apparatuses 1802 and 1803.

On the one hand, in case that the destination IP address of a received IP frame does not coincide with the IP address of the ATM switching apparatus 1801 itself in step S1501, the IP routing part 1310 judges that this destination IP address belongs to the ATM switching apparatus 1802 or 1803, and then checks whether or not a congestion indicator (see FIG. 14) is contained in the header field 1400 of the received IP frame (S1601). In case that the congestion indicator is contained in it, the IP routing part 1310 sends a congestion processing request and the destination IP address to the TCP part congestion control part 1320 (S1602). Then the IP routing part 1310 transfers the received IP frame to the TCP part 1330 through the IP part 120 (S1603), and ends the process.

In case that a congestion indicator is not contained in the header 1400 of a received IP frame in step S1601, the IP routing part 1310 checks whether or not a congestion processing request has been already performed for the destination IP address in the previous processes (S1604). In case that no congestion processing request has been performed, the IP routing part 1310 judges that an ATM switching apparatus corresponding to the destination IP address is kept in a noncongestion state and transfers the received IP frame to the TCP part 1330 through the IP part 120 (S1603), and then ends the process. On the other hand, in case that the IP routing part 1310 has judged that a congestion processing request has been already performed, the IP routing part 1310 judges that the ATM switching apparatus corresponding to the destination IP address has been transited from a congestion state to a noncongestion state and sends a congestion clear processing request and the destination IP address to the TCP part congestion control part 1320 (S1605). And the IP routing part 1310 transfers the received IP frame to the TCP part 1330 through the IP part 120 (S1603), and ends the process.

In such a way as this, the IP routing part 1310 adds a congestion indicator to an IP header or the like and sends it when the ATM switching apparatus 1801 (namely, the ATM switching apparatus provided with this IP routing part 1310) is in a congestion state, and sends a congestion processing request or a congestion clear processing request to the TCP part congestion control part 1320 according to whether or not the sender side ATM switching apparatus is in a congestion state when the IP routing part 1310 has received an IP frame from another ATM switching apparatus.

Next, operation of the TCP part congestion control part 1320 is described with reference to FIG. 17.

Figure 17:
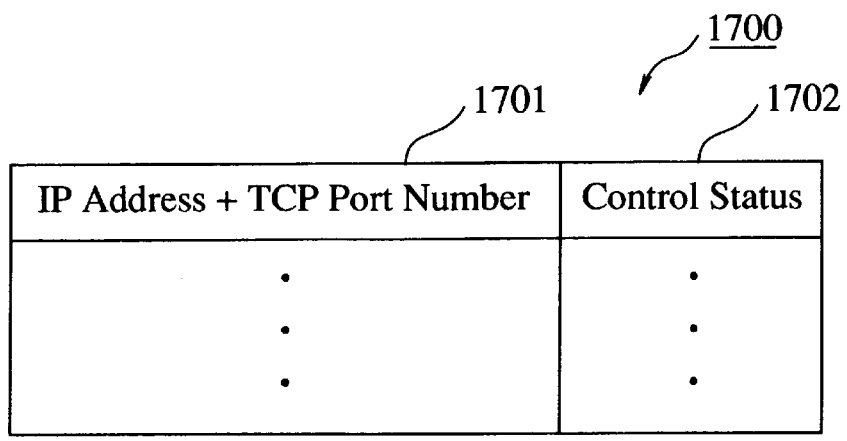
FIG. 17 is a conceptual diagram showing composition of a data flow control table provided in a TCP part congestion control part shown in FIG. 13.

The TCP part congestion control part 206 changes a data flow of the TCP part 204 with reference to a data flow control table shown in FIG. 17 in case that it has received a congestion processing request or a congestion clear processing request from the IP routing 1310.

As shown in FIG. 17, this data flow control table 1700 comprises an "IP address+TCP port number" area 1701 where a pair of an IP address and a TCP port number is stored, and a control status area 1702 where information showing whether or not the TCP part 1330 is performing a data flow control is stored. Here, an IP address is an originator address contained in an IP frame header 1400 (see FIG. 14), and an originator port number is a logical number contained in a TCP header.

When the TCP part congestion control part 206 has received a congestion processing request from the IP routing part 1310 (see step S1510 in FIG. 15), the TCP part congestion control part 206 obtains an "IP address+TCP port number" area 701 corresponding to this congestion processing request on the basis of an IP address received together with this congestion processing request and an originator port number contained in the TCP header corresponding to this IP address, and sets a control status area 702 corresponding to this "IP address+TCP port number" area 701 at "Under Control".

When the TCP part congestion control part 206 has received a congestion clear processing request from the IP routing part 1310 (see step S1513 in FIG. 15), the TCP part congestion control part 206 obtains an "IP address+TCP port number" area 701 corresponding to this congestion clear processing request on the basis of an IP address received together with this congestion clear processing request and an originator port number contained in the TCP header corresponding to this IP address, and sets a control status area 702 corresponding to this "IP address+TCP port number" area 701 at "Under No Control".

The TCP part 1330 performs a data flow control as described above, and performs a data flow control and temporarily suspends a data communication while the control status area 702 of the data flow control table 1700 is set at "Under No Control". On the other hand, when the control status area 702 of the data flow control table 1700 is set at "Under Control", the TCP part 1330 resumes the data flow control.

Due to this, when an ATM switching apparatus 1802 or 1803 other than the ATM switching apparatus 1801 (namely, an ATM switching apparatus provided with this IP routing part 1310) is in a congestion state, it is possible to reduce the CPU activity rate A by lightening a load on the ATM switching apparatus 1802 or 1803.

As described above, according to an ATM switching apparatus of this embodiment, since the ATM switching apparatuses transfer to each other the information showing that they are in a CPU congestion state, the CPU activity rate A of an ATM switching apparatus in a CPU congestion state can be reduced by making another ATM switching apparatus operate.

And this embodiment is the same as the first embodiment in that a CPU activity rate A can be reduced by monitoring the CPU activity rate A by means of the congestion monitoring part 110 and discarding an IP frame received from the LAN control part 2010 or the TCP part 1330.

Moreover, this embodiment is the same as the first embodiment in that an ATM switching apparatus may be composed so as to be provided with both of a discarding means of this embodiment and a discarding means of the prior art, and that which discarding means should be used, a discarding means of this embodiment or a discarding means of the prior art may be selected according to the cause or the degree of increase of the CPU activity rate A.

Furthermore, this embodiment is the same as the first embodiment also in that it can be applied to a packet switching apparatus used in a communication network other than a communication network where an ATM network and a LAN are connected with each other.

This embodiment has shown a case of discarding an IP frame sent by an ATM switching apparatus which has come into a CPU congestion state, but only a data flow control by the TCP of "end-to-end" in another ATM switching apparatus may be performed.

As described above in detail, according to the present invention it is possible to provide a packet switching apparatus capable of surely avoiding a CPU congestion.

What is claimed is:

1. A packet switching apparatus comprising:
    a packet communication part connected to a first communication network for performing communication in packets;
    a frame communication part connected to a second communication network for performing communication in frames;
    a protocol translation part for translating a communication protocol of said first communication network and a communication protocol of said second communication network into each other;
    a congestion monitoring part for judging whether or not the protocol translation part is in a congestion state; and
    a control part for adding information showing a congestion state to a packet to be sent from said packet communication part in case that said congestion monitoring part has judged that said protocol translation part is in a congestion state.

2. A packet switching apparatus as defined in claim 1, wherein; said congestion monitoring part judges whether or not said central processing unit is in a congestion state by comparing an activity rate of said central processing unit and a specified threshold value with each other.

3. A packet switching apparatus as defined in claim 1, wherein; said congestion monitoring part judges a congestion state of said central processing unit as one of plural levels by comparing an activity rate of said central processing unit and specified threshold values of plural levels with each other.

4. A packet switching apparatus as defined in claim 1, wherein;
    said control part sorts frames into a group of frames to be discarded and a group of frames not to be discarded according to congestion state levels judged by said congestion monitoring part.

5. A packet switching apparatus as defined in claim 1, wherein;
    said first communication network is an asynchronous transfer mode communication network.

6. A packet switching apparatus as defined in claim 5, wherein;
    said protocol translation part is an Internet protocol part and said control part is an Internet protocol routing part.

7. A packet switching apparatus as defined in claim 6, wherein;
    said frame discarding operation is performed by not sending said frame from said Internet protocol part to said Internet protocol routing part.

8. A packet switching apparatus as defined in claim 6, wherein;
    said frame discarding operation is performed by deleting an Internet protocol address from an address resolution protocol table provided inside said Internet protocol routing part.

9. A packet switching apparatus as defined in claim 1, wherein;
    said second communication network is a local area network.

10. A packet switching apparatus as defined in claim 1, wherein:
    said control part is provided with a function of discarding a part or all of the frames received by said frame communication part in case that said congestion monitoring part has judged that said protocol translation part is in a congestion state.

11. A packet switching apparatus comprising:
    a packet communication part connected to a first communication network for performing communication in packets;
    a frame communication part connected to a second communication network for performing communication in frames;
    a protocol translation part for translating a communication protocol of said first communication network and a communication protocol of said second communication network into each other;
    a control part for discarding a frame taking an origination address of a packet as its destination address in case that information showing a congestion state is added to said packet received by said packet communication part.

12. A packet switching apparatus as defined in claim 11, wherein:
    said frame discarding operation is performed by stopping a data flow control of a transmission control protocol.

* * * * *